United States Patent [19]
Celorier, Jr. et al.

[11] Patent Number: 5,758,820
[45] Date of Patent: Jun. 2, 1998

[54] HEAT RECOVERY SYSTEM

[75] Inventors: George M. Celorier, Jr., Franklin; Joseph Gerstmann, Framingham; Andrew D. Vasilakis, Bedford, all of Mass.

[73] Assignee: Amtrol Inc., R.I.

[21] Appl. No.: 785,461

[22] Filed: Jan. 17, 1997

[51] Int. Cl.$^6$ ........................ G05D 23/00
[52] U.S. Cl. ................ 237/2 B; 237/8 A; 62/238.6
[58] Field of Search ............ 237/8 A, 2 B; 62/238.6; 126/613, 609, 610; 236/78 B

[56] References Cited

U.S. PATENT DOCUMENTS

| | | | |
|---|---|---|---|
| 2,415,522 | 2/1947 | Osterheld | 236/78 B |
| 2,415,966 | 2/1947 | Osterheld | 236/78 B |
| 3,661,325 | 5/1972 | Altenstadt | 236/78 B |
| 4,041,726 | 8/1977 | Mueller et al. | 62/238 |
| 4,238,931 | 12/1980 | Campbell | 62/183 |
| 4,293,323 | 10/1981 | Cohen | 62/238.6 |
| 4,680,941 | 7/1987 | Richardson et al. | 62/184 |
| 4,773,231 | 9/1988 | Sulzberger | 62/238.6 |
| 4,885,915 | 12/1989 | Jakobsson | 62/238.6 |
| 4,955,207 | 9/1990 | Mink | 62/238.6 |
| 5,020,721 | 6/1991 | Horne | 236/20 R |
| 5,050,394 | 9/1991 | Dudley et al. | 62/115 |
| 5,054,542 | 10/1991 | Young et al. | 165/58 |
| 5,220,807 | 6/1993 | Bourne et al. | 62/238.6 |

*Primary Examiner*—Henry A. Bennett
*Assistant Examiner*—Derek S. Boles
*Attorney, Agent, or Firm*—Joseph J. Kaliko

[57] ABSTRACT

A heat recovery system (including associated methods, apparatus and controls for implementing such a system) integrated in a hot water heating system that is combinable with an air conditioning loop containing hot gas wherein the hot water system selectively utilizes heat recovered from the hot gas to produce and store hot water at a preselected temperature level requiring the use of only a single water storage tank. According to one aspect of the invention, hot gas is taken from the air conditioning loop and placed directly into a heat exchanger coil immersed in the water storage tank for selective use therein to produce hot water. According to a further aspect of the invention, a control means is provided to monitor and analyze water temperatures at a plurality of locations within the water storage tank; determine the presence of hot gas and its temperature; and, as a function of the set point for the hot water heating system, selectively activate at least one of a plurality of heaters located in the water storage tank. The heaters include a heat exchanger that may be energized by the hot gas when the gas is at a desirable temperature and available for use; and at least one other heating element, such as electrically energizable heating elements.

52 Claims, 10 Drawing Sheets

HEAT RECOVERY SYSTEM

BACKGROUND OF THE INVENTION

1. Field of the Invention

The invention generally relates to methods and apparatus for recovering heat from air conditioning systems (where the term "air conditioning" as used herein is intended to include both cooling and/or heating systems, such as traditional air conditioning systems, heat pumps, etc.), for use by a hot water heating system to make and store hot water.

More particularly, the invention relates to a heat recovery system (including associated methods, apparatus and controls for implementing such a system) integrated in a hot water heating system that is combinable with an air conditioning loop containing hot gas (where the term "air conditioning loop" as used herein refers to the fluid path used to carry a refrigerant between the components of prior art air conditioning systems), wherein the hot water system selectively utilizes heat recovered from the hot gas to produce and store hot water at a preselected temperature level requiring the use of only a single water storage tank.

According to one aspect of the invention, hot gas is taken from the air conditioning loop and placed directly into a heat exchanger coil immersed in the water storage tank for selective use therein to produce hot water. For example, the hot gas could be taken from a portion of a pre-existing air conditioning loop (which the hot water system, in accordance with one aspect of the invention, is combined with) located at a compressor discharge. From that location the hot gas could be communicated via a gas supply line into the hot water heating system. The warm gas then being returned from the water heater can re-enter (or continue within) the air conditioning loop by being returned to a condenser in the loop; or to a reversing valve in the case of a heat pump.

According to a further aspect of the invention, a control means is provided to monitor and analyze water temperatures at a plurality of locations within the water storage tank; determine the presence of hot gas and its temperature; and, as a function of the set point for the hot water heating system, selectively activate at least one of a plurality of heaters located in the water storage tank. The heaters include a heat exchanger that may be energized by the hot gas when the gas is at a desirable temperature and available for use; and at least one other heating element, such as electrically energizable heating elements.

2. Description of the Related Art

Those skilled in the art will recognize that there exist many systems and techniques for using hot gas typically found in an air conditioning loop to heat water.

Examples of such systems and techniques, described hereinafter for background purposes and for the purpose of exemplifying the state of the art, include the teaching found in: U.S. Pat. No. 4,041,726, issued to Muller et al., on Aug. 16, 1977; U.S. Pat. No. 4,098,092, issued to Singh on Jul. 4, 1978; U.S. Pat. No. 4,141,222, issued to Ritchie on Feb. 27, 1979; a series of patents issued to Robinson, Jr. (U.S. Pat. Nos. 4,330,309, 4,995,930 and 5,052,187 issued respectively on May 18, 1982, Sep. 11, 1990 and Oct. 1, 1991); U.S. Pat. No. 5,050,394, issued to Dudley et al., on Sep. 24, 1991; U.S. Pat. No. 4,474,018, issued to Teagan on Oct. 2, 1984; and German Patent DE 002851169A, issued May 31, 1979.

U.S. Pat. No. 4,041,726 to Muller et al. is an example of prior art that describes a hot water system which utilizes the waste heat from the refrigerant of a refrigeration system to produce hot water.

The utilized heat includes the superheat of a refrigerant vapor (plus the heat of condensation or latent heat, and part of the sensible heat of the liquid refrigerant); with the water being heated to a selected temperature by being passed through a water-cooled condensing unit. The condensing unit has a water inlet and an outlet between which is connected a water storage tank.

Muller et al. exemplifies prior art hot water heating systems of the type that use a heat exchanger remotely located from the water storage tank to heat the water. Such systems require that water be pumped between the heat exchanger and the water storage tank.

In fact, in the case of Muller et al., the water needs to be pumped from water storage tank 18 to the air conditioning loop into a separate second tank 40 within Muller et al's. condensing unit 10 (where the water is heated by the refrigerant vapor, etc.); and then needs to be pumped back to storage tank 18.

Those skilled in the art will readily appreciate that water pumping requirements, such as those taught by Muller et al., add not only to system complexity, but are inherently problematic because of the heat losses sustained by pumping heated water between the condenser tank and the storage tank, including standing losses associated with heated water sitting in the piping between the points that heated water is being pumped to and from. Additionally the requirement that separate tanks be used to store hot water and to produce hot water adds to system cost, complexity and reliability.

U.S. Pat. No. 4,098,092 to Singh is an example of prior art that describes a system for producing hot water utilizing the heat from a refrigerant included in a heating system. The system requires the use of a separate preheat tank (for the water) that includes a heat exchanger; with the preheated water being supplied to a separate conventional water heater, shown as an electrically powered coil by Singh.

More particularly, Singh, like Muller et al., describes a two tank system (shown as tanks 25 and 26 in the Singh patent); with the two tanks being connected in series. The first tank (tank 25) takes in cold water and heats the water via a heat exchanger 30 located within tank 25. The heating system described by Singh is of the heat pump type and provides hot refrigerant gas to heat exchanger 30 as the gas travels through the heating loop. The heated water is then pumped through a conduit 28 to a second tank 26 (the conventional water heater) where it is stored.

Those skilled in the art will readily appreciate that Singh, in order to implement the described water preheating system using a heated refrigerant, etc., requires that water be pumped from a first storage tank to a second storage tank and accordingly, like Muller et al., is susceptible to sustaining heat losses as a result of the pumping activity. Again, system cost and complexity is adversely affected by the need for separate tanks, pumping control mechanisms, etc.

U.S. Pat. No. 4,141,222 to Ritchie describes an energy recovery system for refrigeration systems in which the flow of water through a storage tank and heat exchanger is controlled by a pump operating during operation of a compressor in such systems (preferably only when the heat exchanger is sufficiently heated). A temperature sensing diverting valve causes pumped water to bypass the heat exchanger when the water temperature within the tank reaches a predetermined maximum value.

According to Ritchie, separate tanks are once again required for storing heated water and for heating water via the heat exchange device; water is diverted to the heat exchanger requiring a water pumping operation; the pump is designed to operate only when the compressor is on and therefore needs to be controlled to operate properly; and like the other patents discussed hereinabove, the heat recovery techniques taught by Ritchie are susceptible to sustaining heated water heat losses as a result of the required water pumping activity.

The series of patents issued to Robinson, Jr. (U.S. Pat. Nos. 4,330,309, 4,995,930 and 5,052,187), describe other techniques which illustrate state of the art hot water heating systems. These illustrative systems all use heat pumps that put all of their energy into the hot water heating system (the heat pumps are dedicated to providing energy for producing hot water). In other words, the Robinson, Jr. systems are not heat recovery systems utilizing waste heat from some other heating or cooling process to reduce the cost of making hot water.

Furthermore, all of the systems described by Robinson, Jr., require water to circulate outside the principal water storage tank and therefore suffer from the same drawbacks of the systems previously discussed herein.

U.S. Pat. No. 5,050,394, issued to Dudley et al. and U.S. Pat. No. 4,474,018, issued to Teagan, are further examples prior art water heating systems that utilize a heat exchanger located outside the water storage tank to heat water. Both of these systems suffer from the previously discussed problems associated with having to pump water between the heat exchanger and storage tank locations, including having to deal with standing heat losses, etc.

German Patent DE 002851169A, issued May 31, 1979, describes a multiple source hot water tank which has a solar coil located at the bottom of the tank and an electric heater located at the top of the tank. Both of these heating elements are located within a single tank structure.

Even though a single tank structure is shown by the German reference within which to perform a heat recovery process, the reference completely fails to teach, claim or even suggest methods, apparatus and/or control mechanisms for (a) combining an air conditioning loop containing hot gas with a hot water system that selectively utilizes heat recovered from the hot gas to produce and store hot water at a preselected temperature level; (b) taking hot gas from an air conditioning loop and placing it directly into a heat exchanger coil immersed in a water storage tank for selective use in the tank to produce hot water; or (c) utilizing a control means, capable of monitoring and analyzing water temperatures at a plurality of locations within a water storage tank, to determine the presence of hot gas and its temperature and, as a function of the set point for the hot water heating system, selectively activate at least one of a plurality of heaters located in the tank including a heat exchanger that may be energized by the hot gas when the gas is at a desirable temperature and available for use.

In view of the state of the art, as exemplified by the aforementioned references, it would be desirable to provide methods, apparatus and control mechanisms for improving processes used to recover heat from closed systems that contain hot gas, such as air conditioning loops.

Furthermore, it would be desirable to provide methods, apparatus and control mechanisms for improving the ability to recover and utilize waste heat from closed systems that contain hot gases in order to heat hot water.

Further still, it would be desirable to provide methods, apparatus and control mechanisms for selectively utilizing heat recovered from hot gas contained in an air conditioning loop to produce and store hot water at a preselected temperature in a water storage tank.

It would also be desirable if such methods, apparatus and control mechanisms did not require the use of a heat exchanger remotely located from the water storage tank to thereby eliminate the need for pumping water between two or more locations to recover heat from the aforementioned hot gas.

Additionally, it would be desirable if the aforementioned methods, apparatus and control mechanisms to perform the heat recovery process could be practiced using only a single water storage tank.

Further yet, it would be desirable if the aforementioned methods, apparatus and control mechanisms could be practiced within a single insulated water heater unit that includes the single water storage tank referred to hereinabove.

In addition to the above, it would be desirable to provide methods, apparatus and control mechanisms for performing heat recovery as described hereinabove using a hot water heater that is simple in design, cost effective to manufacture and can be sold as a stand alone unit that is easy to retrofit for use with existing heating and air conditioning systems. For example, it would be desirable if the aforementioned desired methods, apparatus and control mechanisms incorporated in a hot water system were able to detect whether or not a compressor in an air conditioning loop is on without requiring the use of external wiring.

Still another desire would be to provide heat recovery systems for use in heating water that are inherently designed to conserve energy, reduce operating costs and conserve natural resources.

SUMMARY OF THE INVENTION

In view of the foregoing, it is a general object of the invention to provide methods and apparatus for improving the ability to utilize and recover heat from closed systems that contain hot gases, such as air conditioning loops.

More particularly, it is an object of the invention to provide methods, apparatus and control mechanisms for improving the ability to recover and utilize waste heat from closed systems that contain hot gases in order to heat hot water.

Furthermore, it is an object of the invention to provide methods, apparatus and control mechanisms for selectively utilizing heat recovered from hot gas contained in an air conditioning loop to produce and store hot water at a preselected temperature in a water storage tank.

It is a further object of the invention to provide a hot water heating system that does not require the use of a heat exchanger remotely located from the system's water storage tank in order to recover heat from the hot gas contained in an air conditioning loop. This is in concert with yet another object of the invention which is to eliminate the need for pumping water between two or more locations to recover heat from the hot gas.

Additionally, it is an object of the invention to provide methods, apparatus and control mechanisms suitable for performing the desired heat recovery process using only a single water storage tank; with the tank preferably being included as part of a single insulated water heater unit.

Further still, it is an object of the invention to provide methods, apparatus and control mechanisms for performing heat recovery as described hereinabove using a hot water heater that is simple in design, cost effective to manufacture and can be sold as a stand alone unit that is easy to retrofit for use with existing heating and air conditioning systems.

Yet another object of the invention is to provide heat recovery systems for use in heating water that are inherently designed to conserve energy, reduce operating costs and conserve natural resources.

According to one aspect of the invention a heat recovery system is described that comprises a hot water heater that includes an insulated water storage tank and a control mechanism for monitoring water temperature within the tank (preferably at a plurality of locations) in comparison with the hot water heater temperature set point. The control mechanism also checks for the presence and temperature of hot gas in an air conditioning loop to which the hot water heater is coupled. Based on the water temperature(s) monitored, the aforementioned temperature set point and the presence (or absence) and temperature of the hot gas, the control mechanism operates heaters contained in the tank. At least one of the heaters contained in the tank is a heat exchanger which can be selectively energized with the hot gas channelled thereto by the control mechanism.

In an exemplary embodiment of the invention, set forth hereinafter for the sake of illustration only, a single water storage tank is described that contains the aforementioned heat exchanger located in proximity the bottom of the tank; together with two electric heating elements, one located in proximity to the top of the tank and the other near the bottom where the heat exchanger is located. Only the single water storage tank is required to practice the invention.

According to an alternate characterization of the invention, the heat recovery system hot gas is taken from the air conditioning loop and placed directly into a heat exchanger coil immersed in the water storage tank for selective use therein to produce hot water. For example, as indicated hereinbefore, the hot gas could be taken from a portion of a pre-existing air conditioning loop located at a compressor discharge. From that location the hot gas can be communicated via a gas supply line into a heat exchanger coil immersed in a water storage tank included in the water heating system. The warm gas then being returned from the heater can re-enter (or continue within) the air conditioning loop by being returned to a condenser in the loop; or to a reversing valve in the case of a heat pump.

According to a further aspect of the invention, a control means is provided to monitor and analyze water temperatures at a plurality of locations within the water storage tank; determine the presence of hot gas and its temperature; and, as a function of the set point for the hot water heating system, selectively activate at least one of a plurality of heaters located in the water storage tank. The heaters include a heat exchanger that may be energized by the hot gas when the gas is at a desirable temperature and available for use; and at least one other heating element, such as electrically energizable heating elements.

A first specific aspect of the invention is directed to a heat recovery system integrated in a hot water heating system combinable with an air conditioning loop containing hot gas wherein the hot water system selectively utilizes heat recovered from the hot gas to produce and store hot water at a preselected temperature level in a single storage tank contained therein, comprising: (a) means for determining the presence and temperature of hot gas in the air conditioning loop; (b) means for determining the temperature of water stored in the water storage tank; (c) a heat exchanger located within the tank that is energized by the hot gas; (d) a plurality of heating elements, each located in separate planes within the tank; and (e) control means for selectively activating the heat exchanger and at least one of the plurality of heating elements as a function of the preselected temperature level, the determined presence and temperature of hot gas in the air conditioning loop and the determined temperature of water stored in the water storage tank.

According to various embodiments of this first aspect of the invention at least one of said plurality of heating elements may each be electrically energized; the means for determining the temperature of water is operative to measure water temperature at a plurality of locations within the tank; at least one of the plurality of locations is in proximity to the top of the tank; and at least one other of the plurality of locations is below the location that is in proximity to the top of the tank.

According to various other alternate embodiments of this first specific aspect of the invention the means for determining the temperature of water comprises at least one thermistor; the means for determining the temperature of water is a temperature probe that includes a plurality of thermistors, each of which is associated with one of the plurality of heating elements and is located in the plane of its associated heating element; the heat exchanger is a hot gas coil; and one of the plurality of heating elements is located in proximity to the top of said tank and another of said plurality of heating elements is located in proximity to the bottom of said tank.

According to one particular embodiment of this first specific aspect of the invention, the control means further comprises: (a) processing means used to control the selective activation of the heat exchanger and at least one of the plurality of heating elements as a function of the preselected temperature level, the determined presence and temperature of hot gas in the air conditioning loop and the determined temperature of water stored in the water storage tank; and (b) activation means, coupled to the processing means and a power supply, for selectively enabling the flow of hot gas to the heat exchanger and selectively energizing of at least one of the plurality of heating elements under the control of the processing means.

Still further, according to another particular embodiment of this first specific aspect of the invention, the activation means further comprises: (a) bypass means for enabling hot gas in the air conditioning loop to bypass the hot water heating system so long as the determined temperature of water stored in the tank remains above a first predetermined threshold value; (b) gas diverter means for enabling hot gas in the air conditioning loop to enter the heat exchanger whenever the determined temperature of the water stored in the tank falls below a second predetermined threshold value and hot gas is present in the air conditioning loop; and (c) switching means for selectively switching on at least one heating element included in the plurality of heating elements whenever the determined temperature of water stored in the tank falls below a third predetermined threshold value independent of the presence of hot gas in the air conditioning loop and for selectively switching on at least one other heating element included in the plurality of heating elements whenever the determined temperature of water stored in the tank falls below a fourth predetermined threshold value and hot gas is not present in the air conditioning loop.

Further still, according to yet another embodiment of this first specific aspect of the invention, the bypass means and diverter means further comprises a pair of solenoid activated gas flow control valves operated by a relay coupled to and controlled by the processing means; the switching means is a relay coupled to and controlled by the processing means; and the processing means is programmable (for example, a microprocessor).

According to a preferred embodiment of this first aspect of the invention means are provided for adjusting the preselected temperature level of the hot water heater (for example, a user accessible potentiometer); and the control means further comprises clock means for determining the period of time hot gas is absent from the loop to thereby indicate the length of time the air conditioning system is off. The clock means will allow the control means to adjust the set point of at least one of the plurality of heating elements depending on the length of time the air conditioning system is off.

Furthermore, for energy conservation purposes, one embodiment of this first aspect of the invention operates by disabling one or more heating elements located in the tank whenever hot gas from the air conditioning loop is actually being used to heat water stored in the tank. In addition, various embodiment of the invention contemplate the ability to adjust the set point of one or more heating elements located, to a point below the preselected temperature level for the water heater if hot gas is not being used but is available from the air conditioning loop.

A second specific aspect of the invention is directed to a heat recovery system, for use in water heating system having a preselected water temperature set point, to selectively recover heat from hot gas present in an air conditioning loop to which the water heating system may be coupled, comprising: (a) a water storage tank; (b) a heat exchanger located in the tank; (c) a plurality of heating elements located in the tank; (d) first means for determining the temperature of water stored at a first location in proximity to the top of the tank and for outputting a first signal indicative thereof; (e) second means for determining the temperature of water stored at a second location in the tank below the first location and for outputting a second signal indicative thereof; (f) third means for determining the presence and temperature of the hot gas in the loop and for outputting a third signal indicative thereof; and (g) control means, responsive to the first, second and third signals for selectively activating the heat exchanger and one or more of the plurality of other heating elements as a function of the preselected water temperature set point.

According to various alternate embodiments of this second specific aspect of the invention, at least one of the plurality of heating elements may each be electrically energized; the control means is programmable; the first, second and third means for determining each further comprise a thermistor; means are provided for adjusting the preselected water temperature set point; and the control means further comprises: (a) processing means used to control the selective activation of the heat exchanger and at least one of the plurality of heating elements as a function of the preselected water temperature set point, the determined presence and temperature of hot gas in the air conditioning loop and the determined temperature of water stored in the water storage tank at the first and second locations; and (b) activation means, coupled to the processing means and a power supply, for selectively enabling the flow of hot gas to the heat exchanger and the energizing of at least one of the plurality of heating elements under the control of the processing means.

A third specific aspect of the invention is directed to a heat recovery system including an air conditioning loop containing hot gas and a hot water heating system, having a storage tank included therein, which may be selectively incorporated as part of the air conditioning loop, comprising: (a) control means for determining if hot gas is present in the air conditioning loop; (b) first means for enabling hot gas in the air conditioning loop to bypass the hot water heating system; (c) second means for enabling hot gas in the air conditioning loop to enter a heating coil contained in the hot water heating system; and (d) alternate means for heating water stored in the tank.

According to various alternate embodiments of this third specific aspect of the invention, at least one means for electrically heating the water contained in the tank; at least one means for electrically heating further comprises at least one electric heating element located in proximity to the bottom of the tank and at least one electric heating element located in proximity to the top of the tank; and the control means further comprises: (a) first temperature sensing means for determining the presence or absence of the hot gas in the air conditioning loop; and (b) second temperature sensing means for determining the temperature of water stored in the hot water tank (preferably the second temperature means further comprises a plurality of temperature sensing devices, e.g. thermistors, placed in different locations within the tank).

The control means contemplated by the third specific aspect of the invention, according to various embodiments thereof, is: (a) operative to activate the first means in response to a determination by the second temperature sensing means that the temperature of the water stored in the tank is above a first predetermined threshold value; (b) operative to activate the second means in response to a determination by the second temperature sensing means that the temperature of the water stored in the tank is below a second predetermined threshold value and a determination by the first temperature sensing means that hot gas is present in the air conditioning loop; and is (c) operative to turn on the alternate means for heating in response to a determination by the second temperature sensing means that the temperature of the water stored in the tank is below a third predetermined threshold value and a determination by the first temperature sensing means that hot gas is not present in the air conditioning loop.

Still further, the control means contemplated by the third specific aspect of the invention, according to various embodiments thereof, is: (a) operative to adjust the set point of the second temperature sensing means as a function of the output of the first temperature sensing means; and is (b) operative to adjust the set point of the second temperature sensing means as a function of the amount of time passing after the first temperature sensing means determines the absence of hot gas in the air conditioning loop.

A fourth specific aspect of the invention is directed to apparatus for controlling a heat recovery process performed in a hot water heating system combinable with an air conditioning loop containing hot gas wherein the hot water system selectively utilizes heat recovered from the hot gas to produce and store hot water at a preselected temperature level in a single storage tank contained therein and further wherein the tank includes a plurality of heaters including a heat exchanger that may be energized by the hot gas when the gas is available and at a desired temperature and at least one other heating element, comprising: (a) means for determining the presence and temperature of hot gas in the air conditioning loop; (b) means for determining the temperature of water stored in the water storage tank; and (c) processing means, coupled to the means for determining the presence and temperature of hot gas and the means for determining the temperature of water stored in the water storage tank, for activating at least one of the plurality of heaters located in the tank as a function of the preselected temperature level, the temperature of hot gas when present and the temperature of water stored in the water storage tank.

According to various alternate embodiments of this fourth specific aspect of the invention, the means for determining the temperature of water stored in the water storage tank is operative to measure water temperature at a plurality of locations within the tank; at least one of the plurality of locations is in proximity to the top of the tank; at least one other of the plurality of locations is below the location that is in proximity to the top of the tank; and the processing means is further operative to (a) channel hot gas in the air conditioning loop to bypass the hot water heating system so long as the temperature of the water stored in the tank remains above a first predetermined threshold value; (b) channel hot gas in the air conditioning loop to enter the heat exchanger whenever the temperature of the water stored in the tank falls below a second predetermined threshold value and hot gas is present in the air conditioning loop; and (c) switch on at least one of the plurality of heaters whenever the temperature of water stored in the tank falls below a third predetermined threshold value.

Other aspects of the invention are directed to methods for performing heat recovery from hot gas contained in an air conditioning loop to heat water stored in a storage tank that includes a plurality of heaters including a heat exchanger that may be energized by the hot gas when the gas is available and at a desired temperature and at least one other heating element.

One such method contemplated by the invention (a fifth specific aspect thereof), presented for the sake of illustration only, comprises the steps of: (a) directly placing the hot gas into a heat exchanger coil immersed in a water storage tank for selective use therein to produce hot water; (b) monitoring water temperatures at a plurality of locations within the water storage tank; (c) determining the presence of the hot gas and the temperature thereof; and (d) controlling, as a function of (1) the set point for the hot water heating system, (2) the water temperatures and (3) the presence and temperature of the hot gas, the selective activation of at least one of the plurality of heaters located in the water storage tank.

According to various alternate embodiments of the illustrative method contemplated by the fifth specific aspect of the invention, the set point for the hot water heating system is adjustable; the step of controlling further comprises the step of adjusting the set point on at least one of the at least one other heating element whenever hot gas is available for use in heating stored water; and the step of controlling is programmable.

Yet another specific aspect of the invention (a sixth specific aspect thereof) is directed to a method for controlling a heat recovery process performed in a hot water heating system combinable with an air conditioning loop containing hot gas wherein the hot water system selectively utilizes heat recovered from the hot gas to produce and store hot water at a preselected temperature level in a single storage tank contained therein and further wherein the tank includes a plurality of heaters including a heat exchanger that may be energized by the hot gas when the gas is available and at a desired temperature and at least one other heating element, comprising the steps of: (a) determining the presence and temperature of hot gas in the air conditioning loop; (b) determining the temperature of water stored in the water storage tank; (c) selectively activating at least one of the plurality of heaters located in the tank as a function of the preselected temperature level, the temperature of hot gas when present as determined in step (a) and the temperature of water stored in the water storage tank as determined in step (b).

According to various alternate embodiments of this sixth specific aspect of the invention the step of determining the temperature of water stored in the water storage tank is performed by measuring water temperature at a plurality of locations within the tank; at least one of the plurality of locations is in proximity to the top of the tank; and at least one other of the plurality of locations is below the location that is in proximity to the top of the tank.

According to various other alternate embodiments of this sixth specific aspect of the invention the plurality of heaters is located in proximity to the top of the tank and another of the plurality of heaters is located in proximity to the bottom of the tank; the step of selectively activating further comprises the steps of: (a) channeling hot gas in the air conditioning loop to bypass the hot water heating system so long as the temperature of the water stored in the tank remains above a first predetermined threshold value; (b) channelling hot gas in the air conditioning loop to enter the heat exchanger whenever the temperature of the water stored in the tank falls below a second predetermined threshold value and hot gas is present in the air conditioning loop; and (c) switching on at least one of the plurality of heaters whenever the temperature of water stored in the tank falls below a third predetermined threshold value.

According to still further alternate embodiments of this sixth specific aspect of the invention the preselected temperature level is adjustable; and the predetermined threshold values are adjustable.

In addition the sixth specific aspect of the invention further contemplates methods further comprising the steps of: determining the period of time hot gas is absent from the loop to thereby indicate the length of time the air conditioning system is off; adjusting the set point of at least one of the at least one other heating element depending on the length of time the air conditioning system is off; disabling a heating element, other than the heat exchanger, whenever hot gas from the air conditioning loop is actually being used to heat water stored in the bottom of the tank; and setting back below the preselected temperature level of the hot water heater if hot gas is not being used but is available from the air conditioning loop to heat water stored in the tank.

Advantages and features of the invention include, without limitation, not having to utilize a separate hot water storage tank to perform the heat recovery process; not having to provide for the piping and pumping of hot water between a plurality of locations as is required when using prior art systems having heat exchangers located outside the hot water heater's water storage tank; not having to suffer the heat losses attendant to such requirements; having the ability to adjust the set points of heaters located in the water storage tank (hot gas or electric), etc.

Other features that will become apparent to those skilled in the art following a review of the detailed description of the invention (set forth hereinafter) include, without limitation, a water heater design that allows for the easy removal of the heat exchanger assembly from the hot water storage tank for cleaning and maintenance purposes; a water heater control mechanism that by virtue of its temperature monitoring characteristic serves as a low limit for heat pumps used as the source of hot gas to answer the question "Is the gas hot enough?"; a water heater control mechanism that is capable of (a) locking out specific water heater heating elements when hot gas is available, (b) setting back the temperature threshold (set point) for a heating element if hot gas available, and (c) resetting a set point for a heating element if hot gas is not available over some time period.

These and other objects, embodiments and features of the present invention and the manner of obtaining them will become apparent to those skilled in the art, and the invention itself will be best understood by reference to the following Detailed Description read in conjunction with the accompanying Drawing.

DETAILED DESCRIPTION

The invention will now be described in detail with reference to a specific illustrative embodiment thereof which will demonstrate to those skilled in the art the operating principals of the methods, apparatus and control mechanisms contemplated herein.

Those skilled in the art will readily appreciate that many alternate embodiment and variations of the heat recovery techniques used in the hot water heater about to be described are possible and that specific limitations in the aforementioned illustrative embodiment (for example, number and type of heaters used in the hot water heater; location of heaters within the illustrative hot water storage tank included in the hot water heater, the range and setting of various parameters chosen for the sake of illustrating the operation of the invention's control mechanism, etc.) are intended only for the sake of explaining the invention and its operation. Notwithstanding these limitations, it is intended that the invention taught herein only be limited by the claims appended hereto.

Figure 1:
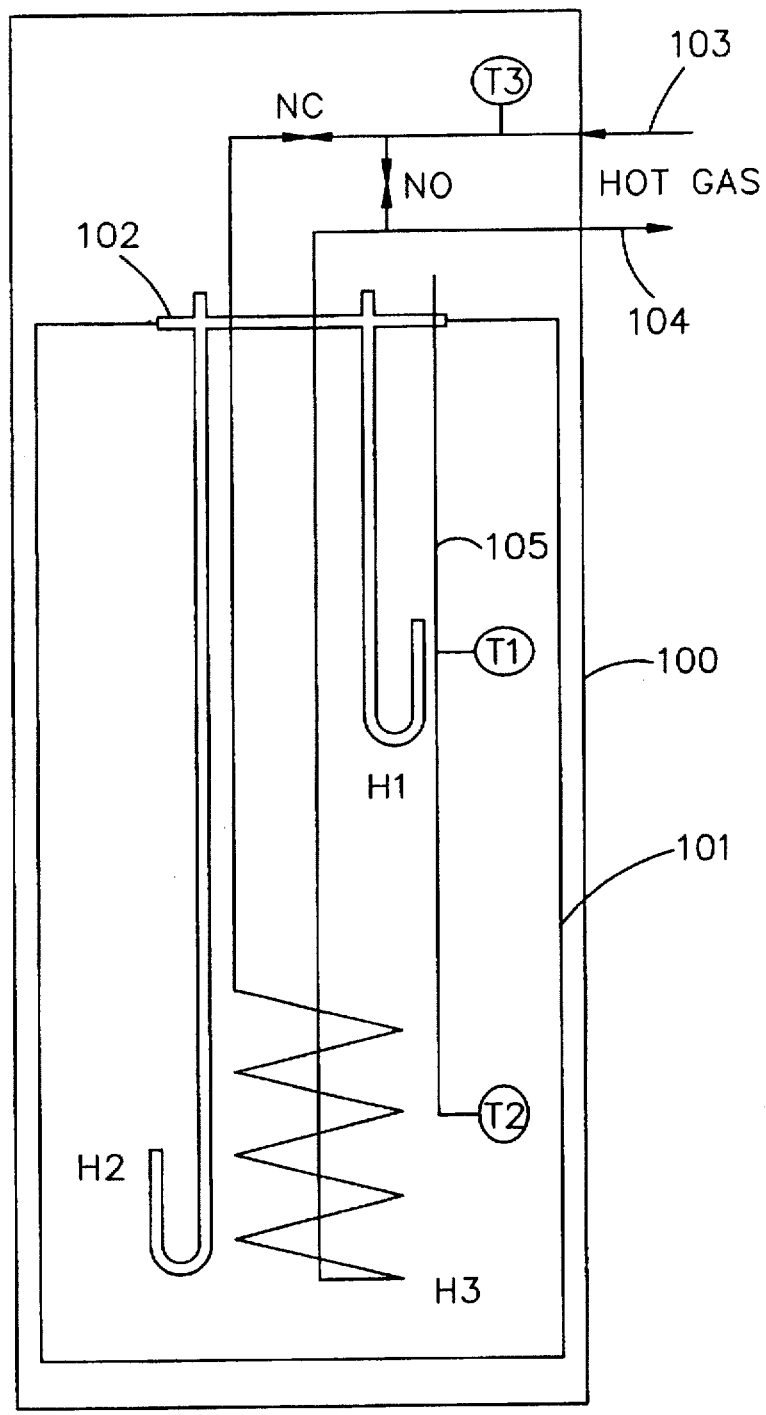
FIG. 1 depicts, in the form of a schematic, the components of an exemplary water heater of the type contemplated by the invention.

As indicated hereinabove, FIG. 1 depicts in schematic form the components of an exemplary hot water heater of the type contemplated by the invention. The exemplary hot water heater shown in FIG. 1 and described in detail hereinafter with reference to subsequent figures, will serve to teach those skilled in the art how to make and use the invention.

Before making reference to FIG. 1 it should be noted that suitable exemplary configurations for refrigerant piping which could be used to combine the exemplary hot water heater with an air conditioning loop; and for water piping which could be used to supply cold water to the hot water heater, will be described in detail hereinafter with reference to FIGS. 2–3, respectively.

Furthermore, exemplary components and a suitable combination of such components for implementing the hot water heater shown schematically in FIG. 1, will be described in detail hereinafter with reference to FIGS. 4–8.

Finally, a control schematic for the exemplary hot water heater system depicted in FIG. 1 and described in detail with reference to FIGS. 4–8; a process flow chart depicting the operation of exemplary control logic suitable for controlling the hot water heating system contemplated by the invention; and a thermistor chart for an exemplary thermistor suitable for use in measuring the temperature of hot gas and water, in the manner and for the purposes taught herein; will be described in detail hereinafter with reference to FIGS. 9–11.

Reference should now be made to FIG. 1 which depicts in schematic form the components of exemplary hot water heater 100. Hot water heater 100 is an example of a hot water heater that employs the heat recovery techniques contemplated by the invention. Hot water heater 100 also incorporates several desirable design characteristics which, although optional, constitute a preferred embodiment of the invention.

In particular, the FIG. 1 schematic for hot water heater 100 shows all of the exemplary components for an illustrative basic hot water heater of the type contemplated by the invention being installed from and at the top of the heater (a preferred embodiment of the invention for reasons to be explained hereinafter).

More particularly, FIG. 1 depicts a mounting plate 102 located at the top of hot water storage tank 101; heaters H1, H2 and H3 mounted on mounting plate 102 (hanging down therefrom and into hot water storage tank 101); hot gas lines 103 and 104 (coupled to and/or part of a source for hot gas, such as an external pre-existing air conditioning loop); temperature probe 105, including thermistors T1 and T2 (or more generally, temperature sensing means), mounted on mounting plate 102 (hanging down therefrom and into hot water storage tank 101), used for monitoring the temperature of hot water stored in hot water storage tank 101 at a plurality of locations therein; thermistor T3, for monitoring the presence and temperature of hot gas on hot gas line 103; and solenoid controlled valves NC and NO, for selectively controlling the flow of hot gas into hot water storage tank 101.

In the illustrative embodiment of the invention depicted in FIG. 1, H1 and H2 are electric heaters (for example each unit could be a 220VAC, 4.5 Kw unit); and are preferably installed (although not required to be installed in the locations indicated) so that the active heating elements are located in proximity to the top and bottom of hot water storage tank 101, respectively, as shown in FIG. 1.

Furthermore, in accordance with the illustrative embodiment of the invention, temperature probe 105 is shown to include two thermistors, T1 and T2, located in the plane of heaters H1 and H2, respectively. A hot gas coil (heater H3), is also depicted in FIG. 1 serving as the heat exchanger for hot water heater 100, and is, like heater H2 (in accordance with the illustrative embodiment of the invention) also located in proximity to the bottom of hot water storage tank 101.

The two solenoid controlled valves, NC and NO, are shown in FIG. 1 as being located in hot gas line 103, coupled to and/or part of a source for hot gas, such as the compressor discharge of a external pre-existing air conditioning loop. Solenoid controlled valves NC and NO, as indicated hereinbefore, are examples of means for controlling the flow direction of the hot gas that is input to hot water heater 100. In one state (for example, the unpowered state) solenoid controlled valves NC and NO are intended to cause hot gas to bypass the hot gas coil in hot water storage tank 101. In another state (the powered state), the valves are intended to channel hot gas into the hot gas coil included in heater H3.

Figure 9:
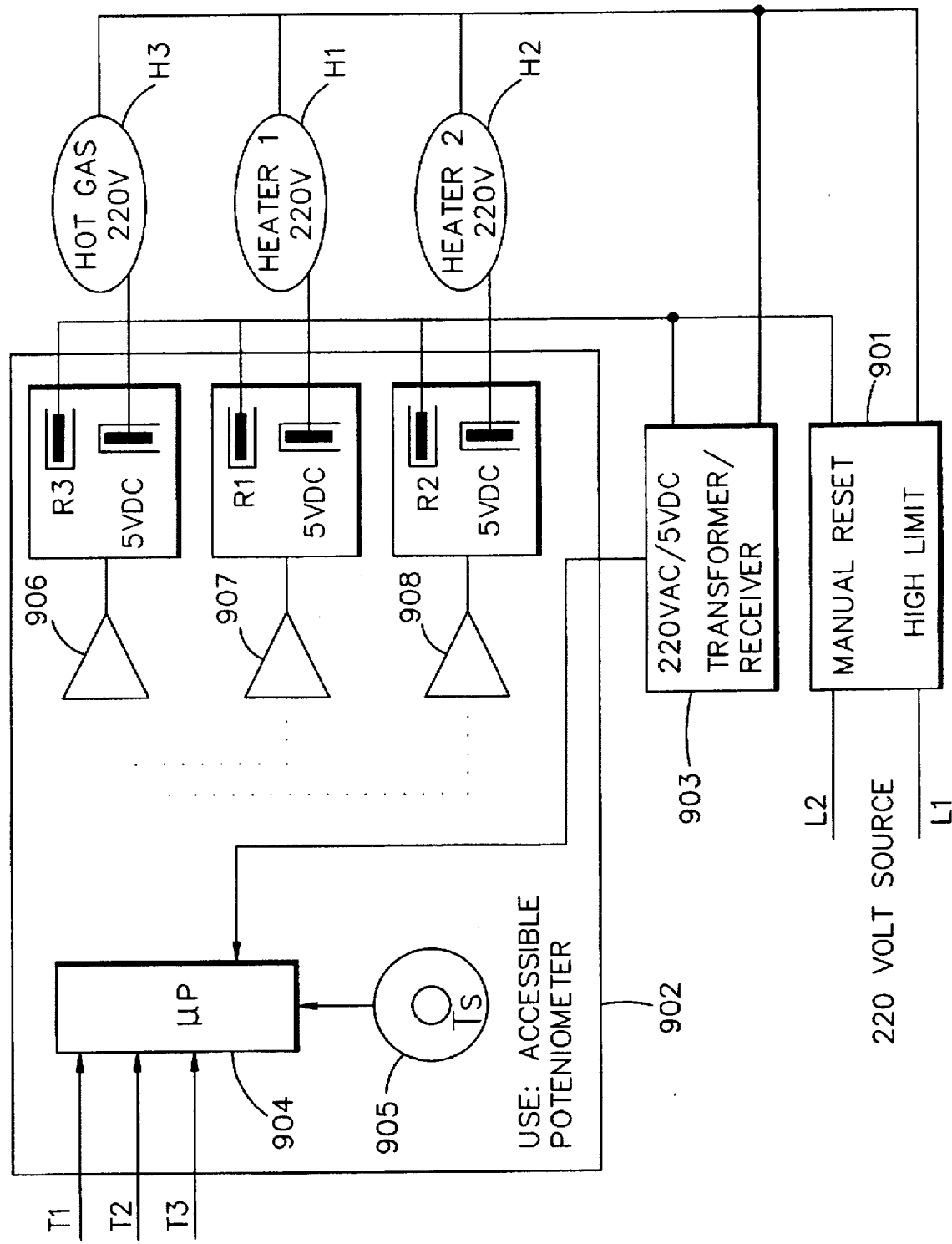
FIG. 9 depicts an exemplary control schematic for the illustrative hot water heater system depicted in FIG. 1 and FIG. 8.
Figure 10:
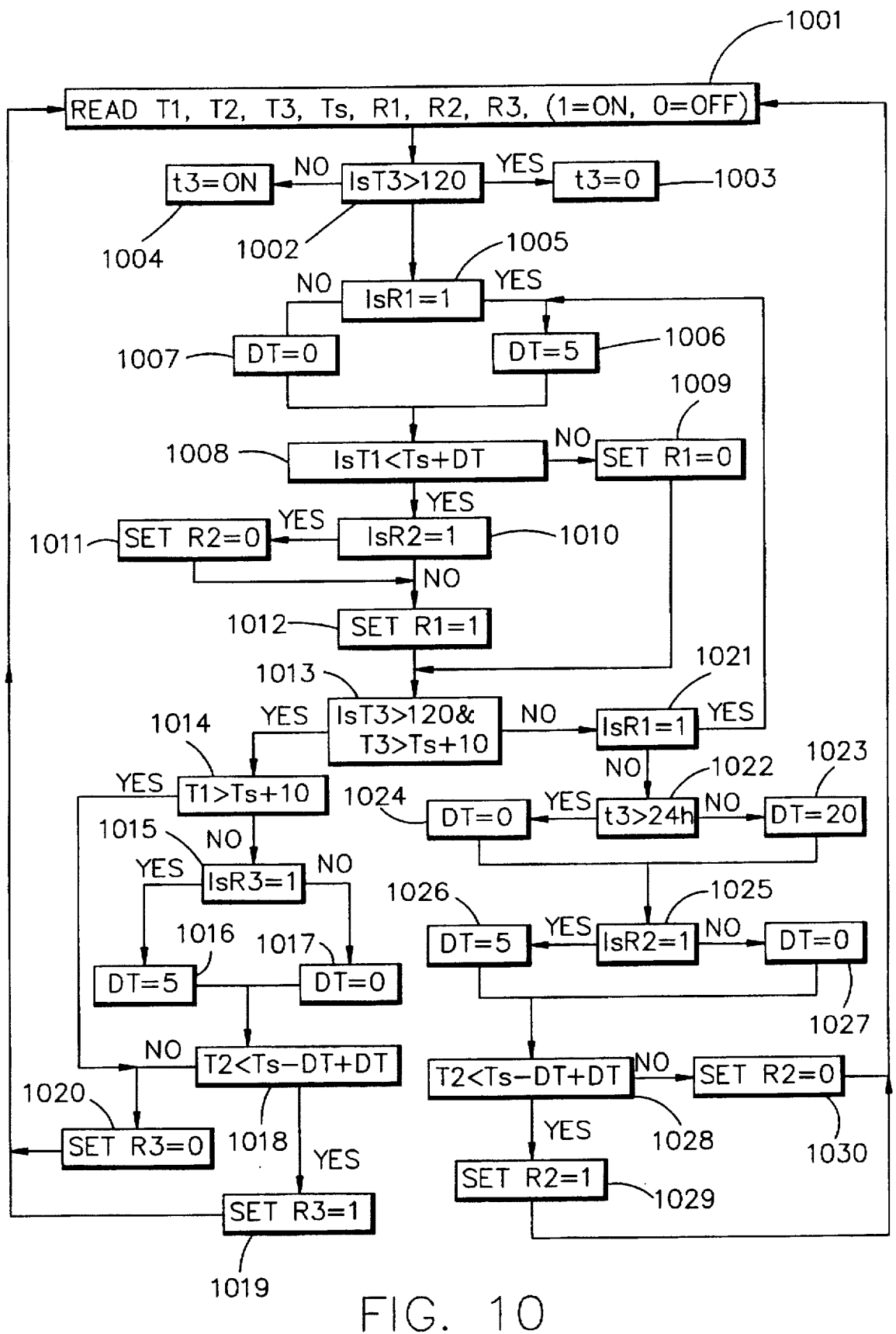
FIG. 10 depicts, in the form of a flow chart, suitable exemplary control logic for controlling a hot water heating system of the type depicted in FIG. 1 and FIG. 8.

Not shown in FIG. 1, but described in detail hereinafter with reference to FIGS. 9–10, is an illustrative control schematic for hot water heater 100 (FIG. 9); and a process flow chart depicting the operation of exemplary control logic suitable for controlling the operation of hot water heater 100 based on a preferably adjustable temperature set point for the heater (Ts) and actual temperature measurements obtained from thermistors T1, T2 and T3.

The control of hot water heater 100 is effected by selectively activating heaters H1, H2 and H3 based on the values of the aforementioned parameters (Ts, T1, T2 and T3). The heaters, as will be explained in greater detail hereinafter, may, in the case of electrical heaters H1 and H2, be (for example) relay activated; and in the case of heater H3, may (for example) be activated via a relay that controls the operation of solenoid controlled valves NC and NO, in the manner described hereinabove.

It should be noted that the exemplary hot water heater design depicted in FIG. 1, with components installed at and through the top of the heater, facilitates the easy removal of the heat exchanger assembly contained in hot water heater 100 (to be described hereinafter in greater detail) from hot water storage tank 101 for cleaning and maintenance purposes; allows for the convenient servicing of the unit in general; allows for the piping of hot gas and water thru the top of the unit (as will be illustrated and described in detail with reference to FIGS. 2–3); and greatly facilities reducing the complexity and cost of manufacturing processes used to fabricate hot water heater 100.

Once again, all of the illustrative components identified and characterized hereinabove are being set forth with particularly only to explain the operating principals of the invention and for no other purpose. Thus, for example and without limitation, alternative means may be used to control the flow of hot gas into hot water heater 100, such as a three way control valve; the valves could be operated using alternate control mechanisms (as opposed to solenoids); hot water heaters which contain fewer or greater than three heating elements could be designed; hot water heaters with components installed from the bottom of the heater instead of the top could be designed; hot water heaters with gas lines coming in from some other part of the heater (for example, the side of the heater), etc., all without departing from the spirit or scope of the invention as limited only by the appended claims.

Figure 2:
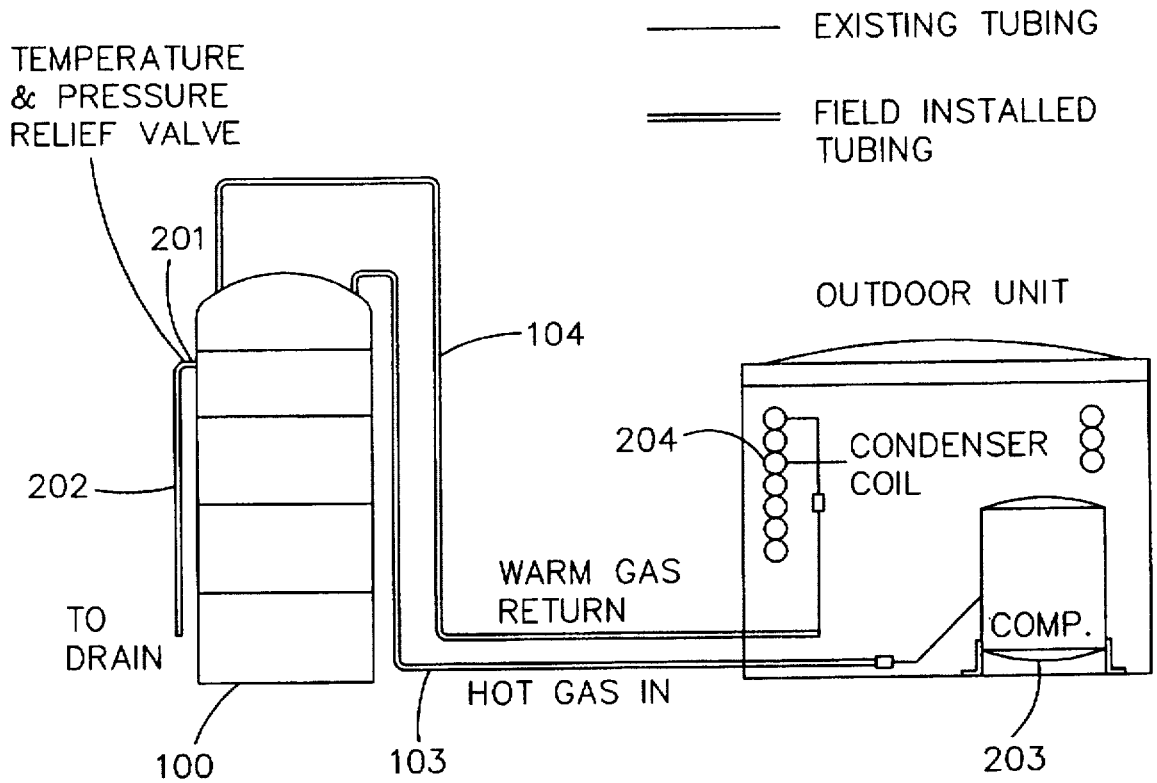
FIG. 2. depicts an example of refrigerant piping which could be used to combine a hot water heater of the type contemplated by the invention with an air conditioning loop.

Reference should now be made to FIG. 2 which, as indicated hereinabove, depicts an example of refrigerant piping which could be used to combine a hot water heater of the type contemplated by the invention (like hot water heater 100) with an air conditioning loop. Also shown in FIG. 2 is piping extending from water heater 100 for pressure relief and overflow drainage purposes.

In particular, FIG. 2 depicts hot water heater 100 fully assembled preferably having a temperature and pressure relief valve 201; an overflow drain pipe 202; and pipe (tubing or line) 103 (also shown in FIG. 1) for delivery of hot gas from an air conditioning loop to hot water heater 100. In FIG. 2 line 103 is shown connected to (or tapped into) the discharge of exemplary compressor 203. In a pre-existing air conditioning loop, compressor 203 would be connected directly to condenser coil 204. The existing tubing in an air conditioning system to which hot water heater 100 may be connected is also illustrated in FIG. 2.

However, as further illustrated by FIG. 2, the hot gas is first delivered, according to one aspect of the invention, directly into hot water heater 100 (via field installed tubing as shown in FIG. 2 if the hot water heater is being retrofit into an existing air conditioning loop). Thereafter the waste heat from the air conditioning system (when the system is running) may be selectively recovered by hot water heater 100, in the manner described herein, before warm gas is returned to condenser coil 204 via warm gas return line 104 (shown in both FIG. 1 and in FIG. 2).

Figure 3:
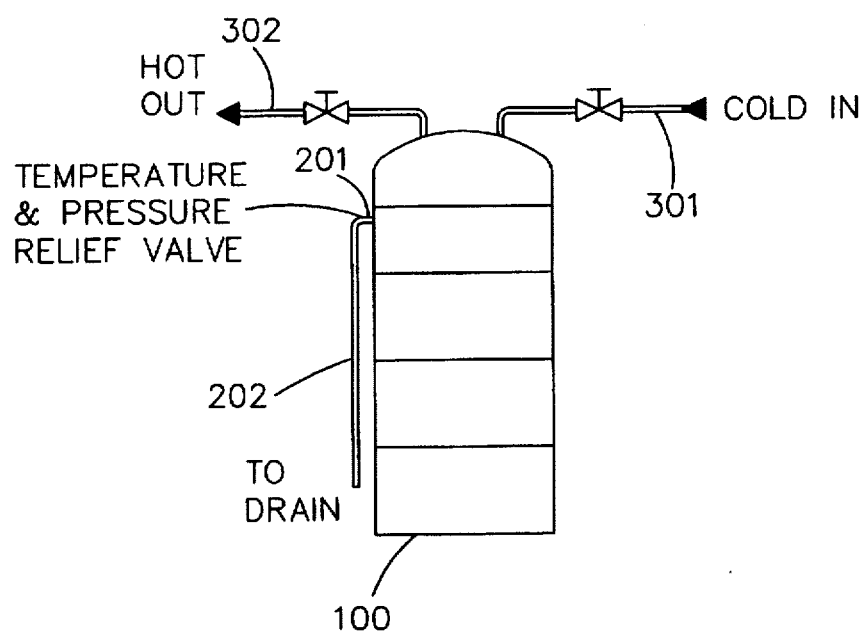
FIG. 3 depicts an example of water piping which could be used to supply cold water to a hot water heater of the type contemplated by the invention; and recover hot water from the heater.

Reference should now be made to FIG. 3 which, as indicated hereinbefore, depicts an example of water piping which could be used to supply cold water to a hot water heater of the type contemplated by the invention; and recover hot water from the heater.

In particular, FIG. 3 (like FIG. 2) depicts hot water heater 100, temperature and pressure relief valve 201 and overflow drain pipe 202. In addition, however, FIG. 3 depicts cold water inlet pipe 301 being connected into the top of illustrative hot water heater 100 from a source of cold water (not shown); hot water outlet pipe 302 also being connected into the top of illustrative hot water heater 100.

As will be seen hereinafter with reference to FIG. 4, provision is made to channel cold water input at the top of hot water heater 100 to the bottom of hot water storage tank 101 so that hot water heater 100 will operate as most hot water systems do with respect to having the hottest water in the water storage tank located at the top thereof. Alternative embodiments of the invention could have the cold water input directly input to the bottom of tank 101; or the piping depicted in FIGS. 2 and 3 coming into (or leaving) some other part of hot water heater 100, without departing from the teachings of the invention.

Figure 4:
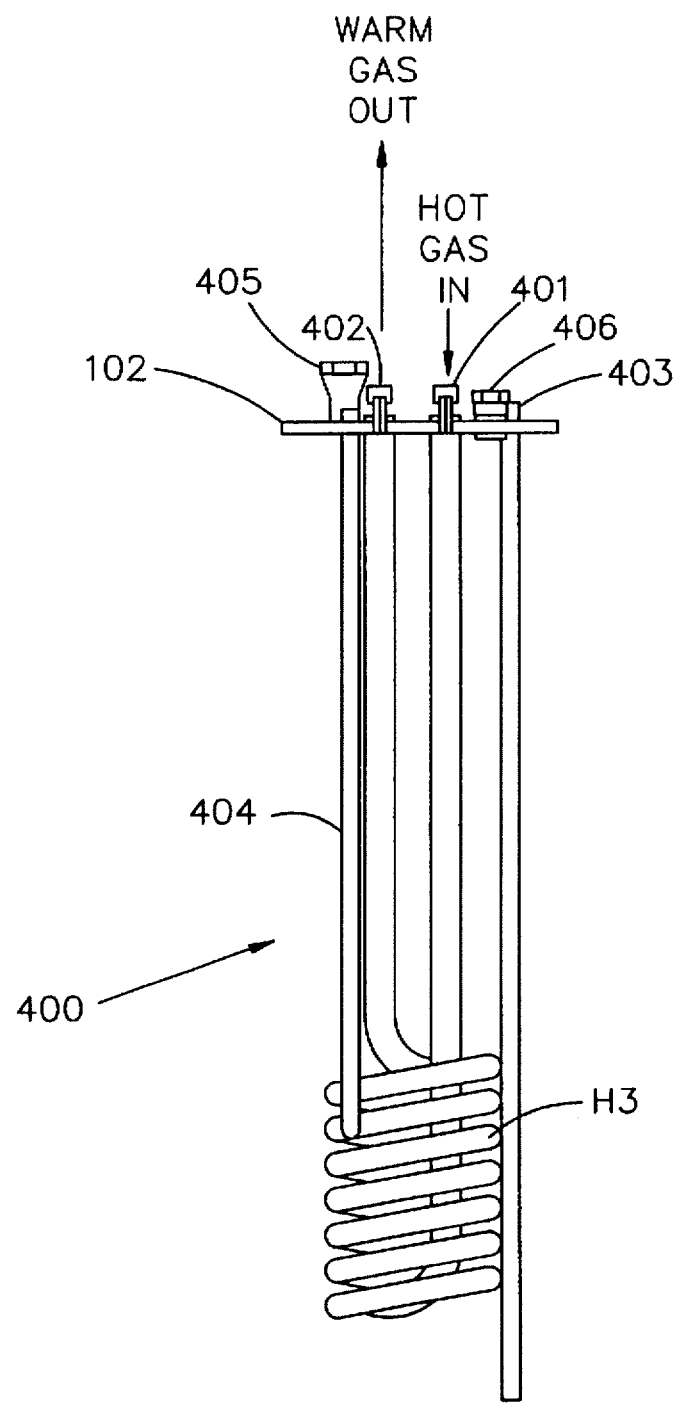
FIG. 4 depicts an exemplary heat exchange assembly suitable for use in practicing the invention.

Reference should now be made to FIG. 4 which, as indicated hereinbefore, depicts an exemplary heat exchange assembly, 400, suitable for use in practicing the invention.

In particular, heat exchanger assembly 400 is shown to include previously discussed mounting plate 102 (for holding, mounting onto hot water storage tank 101 and orienting components of heat exchanger assembly 400); gas inlet and outlet means 401 and 402, respectively; a hot gas coil (heater H3), preferably mounted so that it will be located in proximity to the bottom of hot water storage tank 101; and cold water dip tube 403, for transmitting cold water input at the top of hot water heater 100 to the bottom of hot water storage tank 101.

Also incorporated into heat exchanger assembly 400 as depicted in FIG. 4 is a well 404 for housing the previously discussed temperature probe 105. Well 404 is shown mounted on mounting plate 102 (hanging down therefrom and into hot water storage tank 101). Thermistors T1 and T2 (previously described with reference to FIG. 1) may be appropriately located on temperature probe 105 to monitor the temperature of hot water stored in hot water storage tank 101 at a plurality of locations therein.

FIG. 4 also depicts adapters 405 and 406 on mounting plate 102. As will be seen hereinafter with reference to FIG. 6. adapter 405 carries the aforementioned pressure relief valve 201; and adapter 406 may be used to carry a vacuum breaker for the system.

Figure 5:
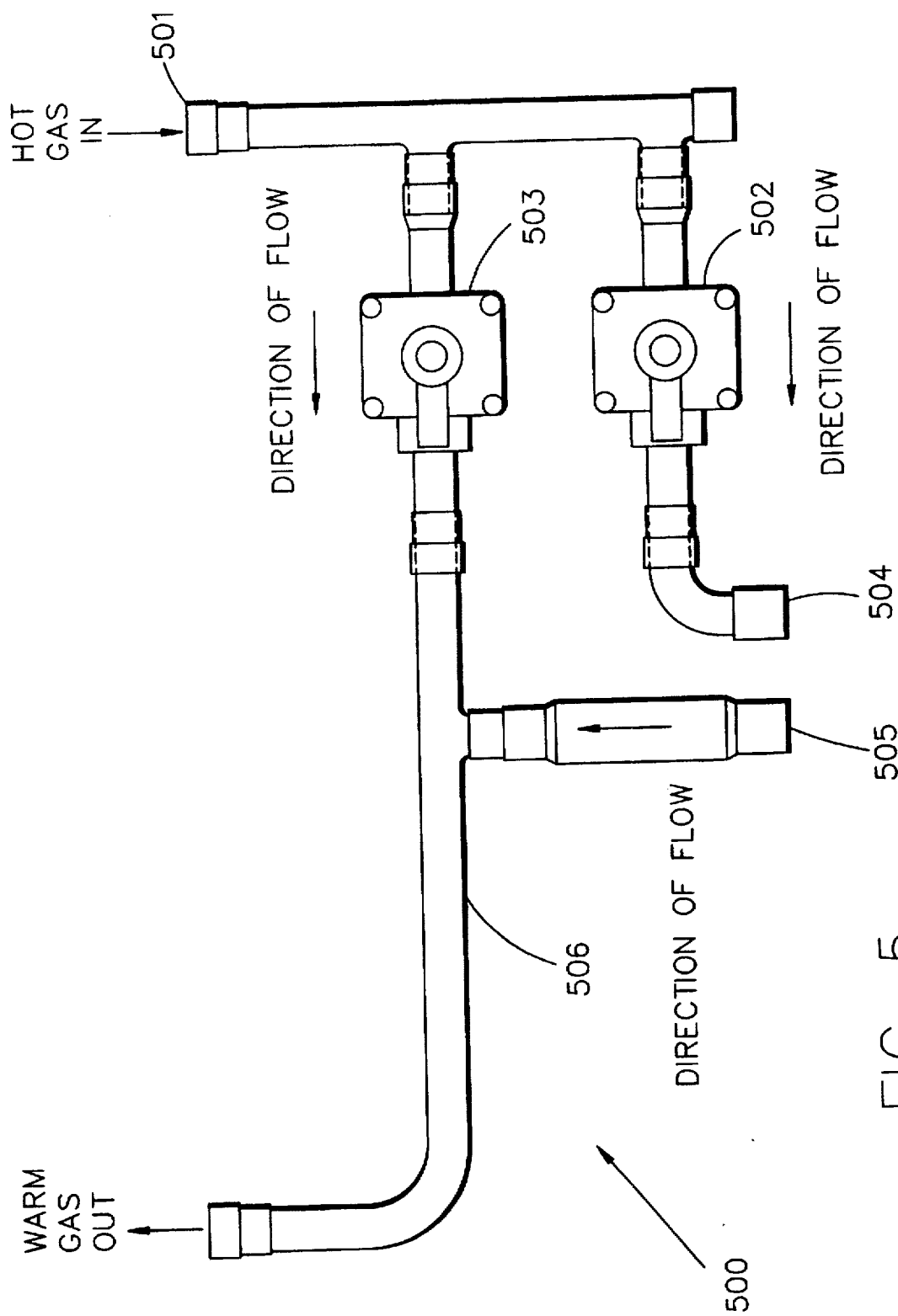
FIG. 5 depicts an exemplary hot gas control assembly suitable for use in practicing the invention.

Reference should now be made to FIG. 5 which, as previously indicated, depicts an exemplary hot gas control assembly suitable for use in practicing the invention.

Figure 6:
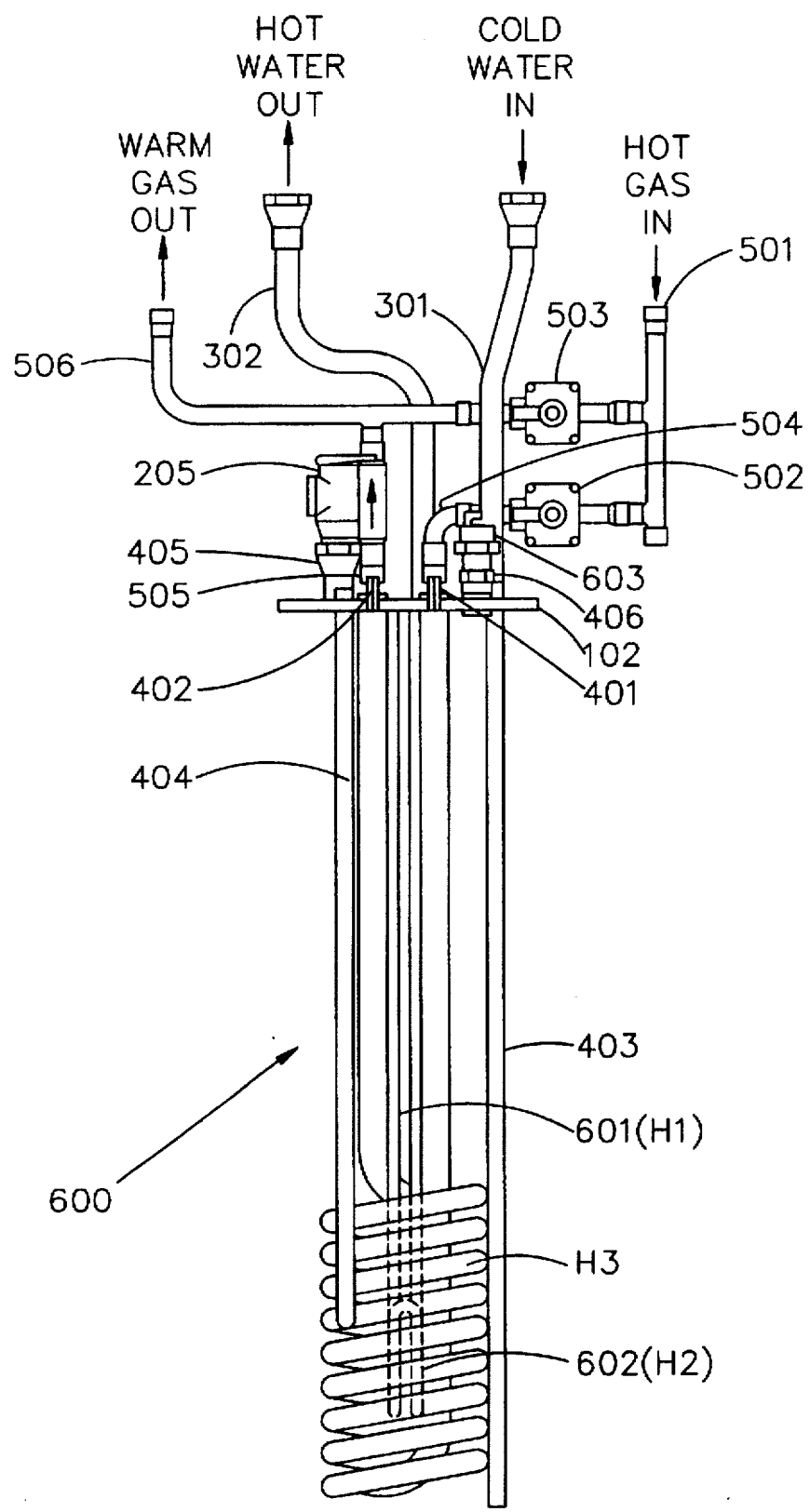
FIG. 6 depicts an exemplary combination of the heat exchange assembly and hot gas control assembly shown in FIG. 4 and FIG. 5, respectively.

FIG. 5 depicts hot gas control assembly 500 which, as shown in FIG. 6. is intended to be combined with heat exchanger assembly 400 depicted in FIG. 4 and described hereinbefore.

More particularly, FIG. 5 depicts hot gas control assembly 500 as including hot gas input tee 501, for accepting hot gas delivered from the air conditioning loop (by, for example, hot gas input line 103); refrigerant valve 502 (for supplying the gas coil in heater H3 with hot gas) and refrigerant valve 503 (the bypass valve), such as solenoid operated valves NC and NO respectively described hereinbefore; elbow 504 for directing the flow of hot gas into the heat exchanger located in hot water storage tank 101; check valve 505, for controlling the direction of gas flow; and warm gas output tee 506, for returning warm gas to the air conditioning loop condenser (if a cooling system is the source of refrigerant) or reversing valve (if a heat pump is the source of refrigerant), as appropriate.

Reference should now be made to FIG. 6 which, as indicated hereinbefore, depicts an exemplary combination of the heat exchange assembly and hot gas control assembly shown in FIG. 4 and FIG. 5, respectively.

In particular, FIG. 6 depicts all the components shown and described with reference to FIGS. 4–5 assembled as one unit; and shows several additional components of the water heater contemplated by the invention.

More particularly, FIG. 6 shows how the assemblies depicted in FIGS. 4–5 may be combined to form combined heat exchange/hot gas control assembly 600 by interconnecting elbow 504 of hot gas control assembly 500 (shown in FIG. 5) with gas inlet means 401 of heat exchanger assembly 400 (shown in FIG. 4); and by interconnecting check valve 505 hot gas control assembly 500 with gas outlet means 402 of heat exchanger assembly 400. The interconnection or coupling of these components may, for example, be accomplished by brazing the components together.

Furthermore, FIG. 6 depicts electric heating elements 601 and 602 (corresponding to heaters H1 and H2 respectively as shown in FIG. 1), which along with the gas coil included in heater H3 is shown supported via mounting plate 102.

FIG. 6 goes on to depict from FIG. 5, hot gas input tee 501, refrigerant valves 502 and 503 and warm gas output tee 506; from FIG. 4, cold water dip tube 403, well 404 and adapters 405 and 406; from FIG. 3, cold water inlet pipe 301 (shown coupled to cold water dip tube 403) and hot water outlet pipe 302 (for outputting hot water from hot water heating 100); and pressure relief valve 201 carried on adapter 405 and a vacuum breaker 603 carried on adapter 406.

Figure 7:
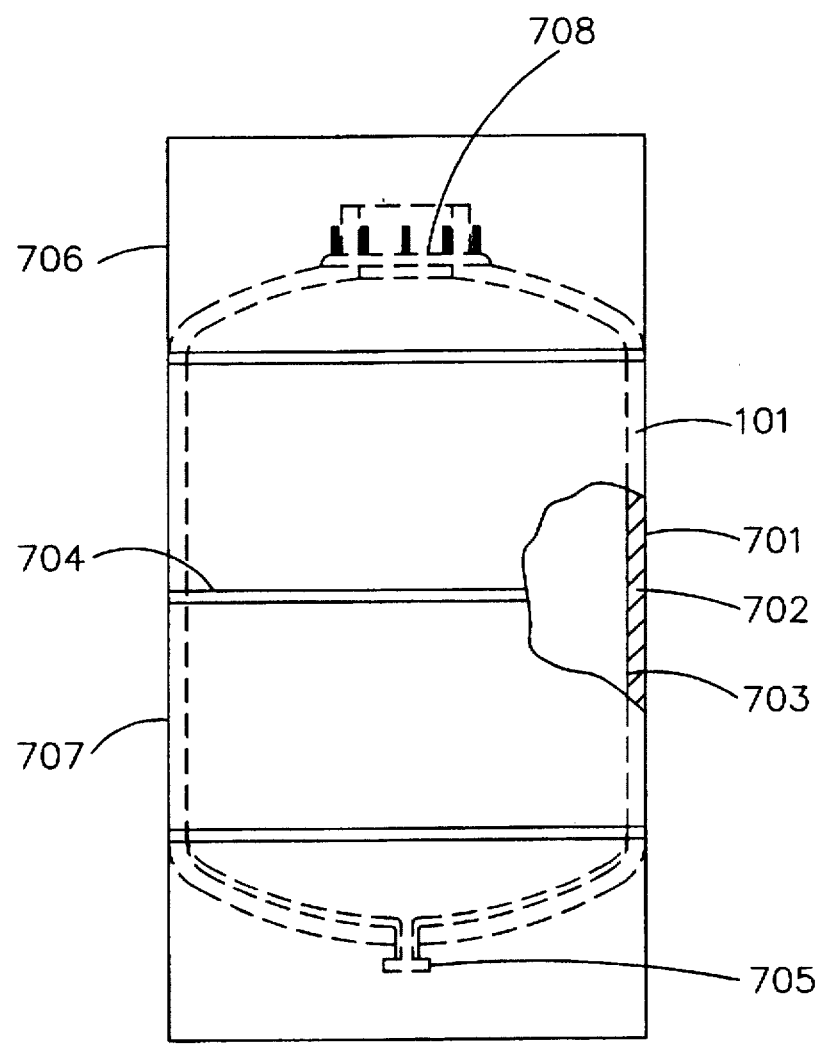
FIG. 7 depicts an illustrative tank sub assembly into which the combined heat exchange/hot gas control assembly shown in FIG. 6 may be installed to practice the invention.

Reference should now be made to FIG. 7 which, as indicated hereinbefore, depicts an illustrative tank subassembly into which the combined heat exchange/hot gas control assembly 600 shown in FIG. 6 may be installed to practice the invention.

More particularly, FIG. 7 shows the illustrative hot water heater tank subassembly contemplated by the illustrative embodiment of the invention as preferably including a heat shielded, lined (corrosion resistant) and insulated water storage tank 101. The shielding, liner and insulation are indicated as being located with the tank wall as shown by reference numerals 701, 702 and 703, respectively.

Hot water storage tank 101 is shown comprised of two tanks halves (Domes A and B), welded at 704 to form the tank itself. The lower half (Dome B) of hot water storage tank 101 is shown to include a drainage outlet 705 to which a drainage pipe (shown in FIG. 8) may be coupled. The drain described with reference to component 705 is typically used when servicing a water heater.

FIG. 7 also shows a top dome assembly 706 and a bottom dome assembly 707 for hot water heater 100. The respective Domes A and B are located within assemblies 706 and 707. Furthermore, as will be seen with reference to FIG. 8, the control mechanism for hot water heater 100 may be conveniently located within top dome assembly 706; while the drain pipe coupled to drainage outlet 705 may be housed in bottom dome assembly 707. Bottom dome assembly 707 may also incorporate (or be used as) as stand for hot water heater 100.

Finally, FIG. 7 depicts a plurality of mounting lugs onto which mounting plate 102 (with combined heat exchange/hot gas control assembly 600 affixed thereto as shown in FIG. 6), may be secured.

Figure 8:
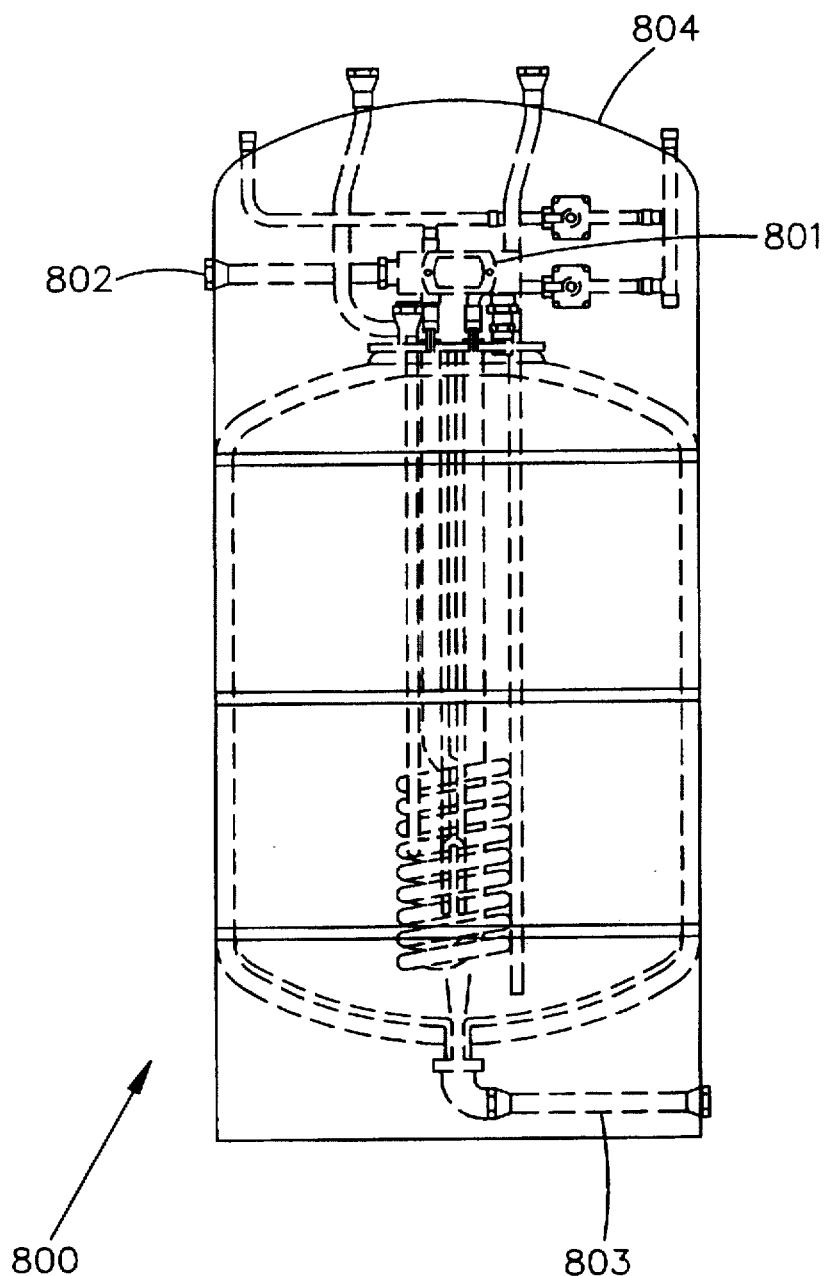
FIG. 8 depicts the details of an illustrative hot water heater incorporating the components described in FIGS. 5–7; with the depicted hot water heater being an exemplary implementation of the heater depicted in schematic form in FIG. 1.

Reference should now be made to FIG. 8 which, as indicated hereinbefore, depicts the details of an illustrative hot water heater incorporating the components described in FIGS. 5–7; with the depicted hot water heater 800 being an exemplary implementation of the heater depicted in schematic form in FIG. 1.

More particularly, FIG. 8 depicts all of the components previously shown and described with reference to FIGS. 5–7, with the addition of a receptacle 801 (the cover of which is illustrated in FIG. 8) for housing the heat recovery control mechanism contemplated by the invention (to be described hereinafter with reference to FIGS. 9–10); pipe 802 coupled to overflow drain pipe 202; and drainage pipe 803, shown coupled to drainage outlet 705.

A dome shaped cover 804 for hot water heater 800 is also depicted in FIG. 8.

Reference should now be made to FIG. 9 which, as indicated hereinabove, depicts an exemplary control schematic for the illustrative hot water heater (including the heat recovery system being described herein), depicted in FIG. 1 and FIG. 8. As shown in FIG. 8, the control mechanism could be housed in receptacle 801.

In particular, the FIG. 9 schematic illustrates 220 volt power entering a manual reset high limit control 901 which could, for example, be mounted on a flange at the top of hot water heater tank 101. Limit 901 opens both legs of the 220 volt power on detecting a high temperature condition.

FIG. 9 goes on to show the power is applied to a circuit board 902 which is used to operate the active elements (H1, H2 and H3) of the illustrative system. The 220 volt power is transformed and rectified to 5VDC as shown at 903 in FIG. 9.

The 5VDC is used to power microprocessor 904 and relays R1, R2 and R3 that operate heaters H1 and H2; and the hot gas control valves (described hereinbefore) that control heater H3.

According to the illustrative embodiment of the invention being described herein the measurements taken by the previously described thermistors T1, T2, and T3 are input to microprocessor 904. According to one embodiment of the invention, microprocessor 904 compares the value of T1 and T2 to a user accessible potentiometer 905 that allows adjustment of the water heater settings (Ts). For the sake of illustration only, it may be assumed that potentiometer 906 has a minimum range for 100 degrees F. to 140 degrees F. In an alternate embodiment of the invention where user adjustment is not permitted, microprocessor 904 could compare the value of T1 and T2 to a preselected set point for the hot water heater.

Depending on the conditions detected, microprocessor 904 (or more generally whatever processing means, programmable or not, that is used to control the selective activation of said heat exchanger and at least one of the plurality of heating elements as a function of a preselected (including user adjustable) temperature level, the determined presence and temperature of hot gas in the air conditioning loop and the determined temperature of water stored in the water storage tank), will operate the relays as illustrated in FIG. 9 via transistors 906–908; and in turn the heaters to satisfy water heating demand.

An exemplary control strategy is set forth hereinafter to demonstrate the operating principals of the invention. Those skilled in the art will readily appreciate that many variations are possible based on application, energy conservation plans and demands, etc. For example, various temperature set points for the hot water heater could be chosen, the control process that determines when to divert hot gas to the heat exchanger to bypass same could be triggered by a set of differing threshold values, etc. Accordingly, the invention is not intended to be limited by the illustrative control strategy that is set forth hereinafter; but only by the claims that are appended hereto.

The illustrative control strategy for a hot water heater of the type depicted in FIG. 1 and FIG. 8, suitable for explaining the operation of the invention, involves the use of program logic. Such a program, an example of which is depicted in FIG. 10 in the form of a flow chart, could (and preferably would) reside in microprocessor 105. The program will be described in detail hereinafter following the presentation of an overview of the illustrative control strategy itself which is as follows:

In warm weather when a cooling type air conditioning system is working, the aforementioned program will control the top tank heater (H1 as shown in FIG. 1) so that it turns on at the user settable temperature setting (Ts).

The bottom heater (H2 as shown in FIG. 1) will be controlled to turn on at a set point that is 20 degrees F. below Ts (this value may be changed; 20 degrees F. was chosen for the sake of illustration only). According to a preferred embodiment of the invention, this is done to maximize the hot gas coil operation of heater H3 (also shown in FIG. 1). Anytime the hot gas temperature (T3) is above 120 degrees F. and Ts+10 the hot gas coil will be turned on independent of top heater operation.

According to the illustrative control strategy, there will be a check that will not allow hot gas heating if the top thermistor shows a temperature 10 degree F. above the set point (Ts). The bottom heater will only be used if there is no hot gas available and the top element is off. Furthermore, according to the illustrative control strategy, the top and bottom heater will not be allowed to operate simultaneously.

Still further, according to the illustrative control strategy, if the air conditioning system is off for a period of time, for example, 24 hours, the differential between the top and bottom setpoint will be eliminated.

Reference should now be made to FIG. 10 which, as indicated hereinbefore depicts, in the form of a program flow chart, suitable exemplary control logic for controlling a hot water heating system of the type depicted in FIG. 1 and FIG. 8. The nomenclature used in and to describe FIG. 10 is as follows:

T1—Top tank temperature reading.
T2—Bottom tank temperature reading.
T3—Hot gas line temperature Reading.
Ts—Temperature set point.
R1—Relay controlling top heater (H1).
R2—Relay controlling bottom heater (H2).
R3—Relay controlling hot gas solenoids (H3).
DT—differential between heat up and cool down for any heating function. For the sake of illustration only assumed to be 5 degrees F.
DT'—differential between top and bottom electric heater set points during periods of active hot gas heating. For the sake of illustration only assumed to be 20 degrees F.
t3—is the R3 off-timer (for example, a microprocessor 105 resident clock).

Referring back to FIG. 10, the illustrative program starts by reading all the temperatures and heater control relay status (for relays on=1 and off=0). This is illustrated at block 1001 in FIG. 10. If the hot gas temperature is greater than 120 degrees F. (block 1002), time t3 is set to zero (block 1003); if not, t3 is set to the on position (block 1004) or allowed to remain on if already accumulating time (this time is used to determine how long the air conditioning system has been off).

The illustrative program for implementing the aforementioned control strategy then checks the status of the top heater relay R1 (block 1005). The program has to determine whether heater H1 is in the heat-up or cool-down mode. This is done by checking the status of relay R1. If the relay is set in the on state (R1=1), then the H1 is in the heat up mode; and vice versa if R1 is not on (R=0).

When H1 is in the heating mode, the program compares (at block 1008) T1 against the set point (Ts+DT). Note, according to the illustrative control strategy, DT=5 in the heat up mode (as indicated at 1006). In the cool down mode, the tank temperature T1 is compared with Ts only (again at block 1008, with DT set to zero at block 1007). This differential (the variable DT which when added to Ts becomes a one of a plurality of threshold values used by the microprocessor for control purposes) is necessary to keep the heater from short cycling. Furthermore, if in the cool down mode, the top heater (H1) control relay R1 is set to the off state (block 1009).

Once the program determines the set point, it checks to see if it should turn on the top heater (i.e., if the result at block 1008 is such that T1<Ts+DT). If the thermostat calls for heat the program checks to make sure that the lower heater (or more precisely its control relay R2) is off (at blocks 1010 and 1011) before turning on the top (heater H1); so that the lower heater (H2) is guaranteed to be off before turning on the top heater (at block 1012), in accordance with the illustrative control strategy described hereinbefore.

The illustrative control program depicted in FIG. 10 than enters the next section when it checks to see if the hot gas (heater H3) should be turned on. The program starts by making sure the gas temperature is higher than both the set point Ts+10 and 120 degrees F. (at block 1013). If it is, the program then checks to make sure (at block 1014) that the top tank temperature is not excessive (T1>Ts+10).

19

If everything is acceptable, illustrative program then goes through similar logic as above when determining if the top heater (H1) was in the heat up or cool down mode (similar logic to that previously described with reference to blocks 1005–1012; without having to perform the block 1010 type check and block 1011 heater shut down operation to avoid H1 and H2 being on at the same time). The "similar" logic is shown at blocks 1015–1020.

If the hot gas temperature is determined to be below 120 degrees F, or below Ts+10 (a block 1013), the program checks the status of the upper heater, H1 (at block 1021). If heater H1 is on (i.e., if its control relay R1 is set to 1) then the control logic returns to the top of the program (it should be recalled that with the upper heater H1 running, H2 is not permitted to be turned on according to the illustrative control strategy outlined hereinbefore).

If the upper element is off (R1=0), the program checks (at block 1022) to see if the AC has operated in the last 24 hours, (t3>24 h). If the air conditioner has been off for less than 24 hours, the program sets (at block 1023) the differential (DT) between the top and bottom heaters to 20 degrees F. If off for greater than 24 hours, the program sets DT' (at block 1024) to 0. Then, as with the other heaters (H1 and H3), the program turns the relay that controls heater H2 (relay R2) on or off (at blocks 1029 or 1030, respectively); after determining if H2 is in the heat up or cool down mode (at block 1025) and comparing the lower tank temperature (T2) with the appropriate temperature setting called for by the control strategy. In the case of the illustrative control strategy, if R2 is on (R2=1), DT is set equal to 5 (at block 1026) and T2 is compared with Ts−DT'+Dt at block 1028 (with DT' having previously been set at either block 1023 or 1024). If R2 is off (R2=0), DT is set equal to 0 (at block 1027) before comparing T2 with Ts−DT'+Dt at block 1028.

After R2 is set to 1 or 0 at block 1029 or 1030 as appropriate, the control logic then returns to the top of the program.

As indicated hereinabove, the program logic described with reference to FIG. 10 has been presented for the sake of illustration only. According to a preferred embodiment of the invention, program parameters (such as, for example, Ts, DT, DT' and t3) would be settable through a table accessible by program.

Figure 11:
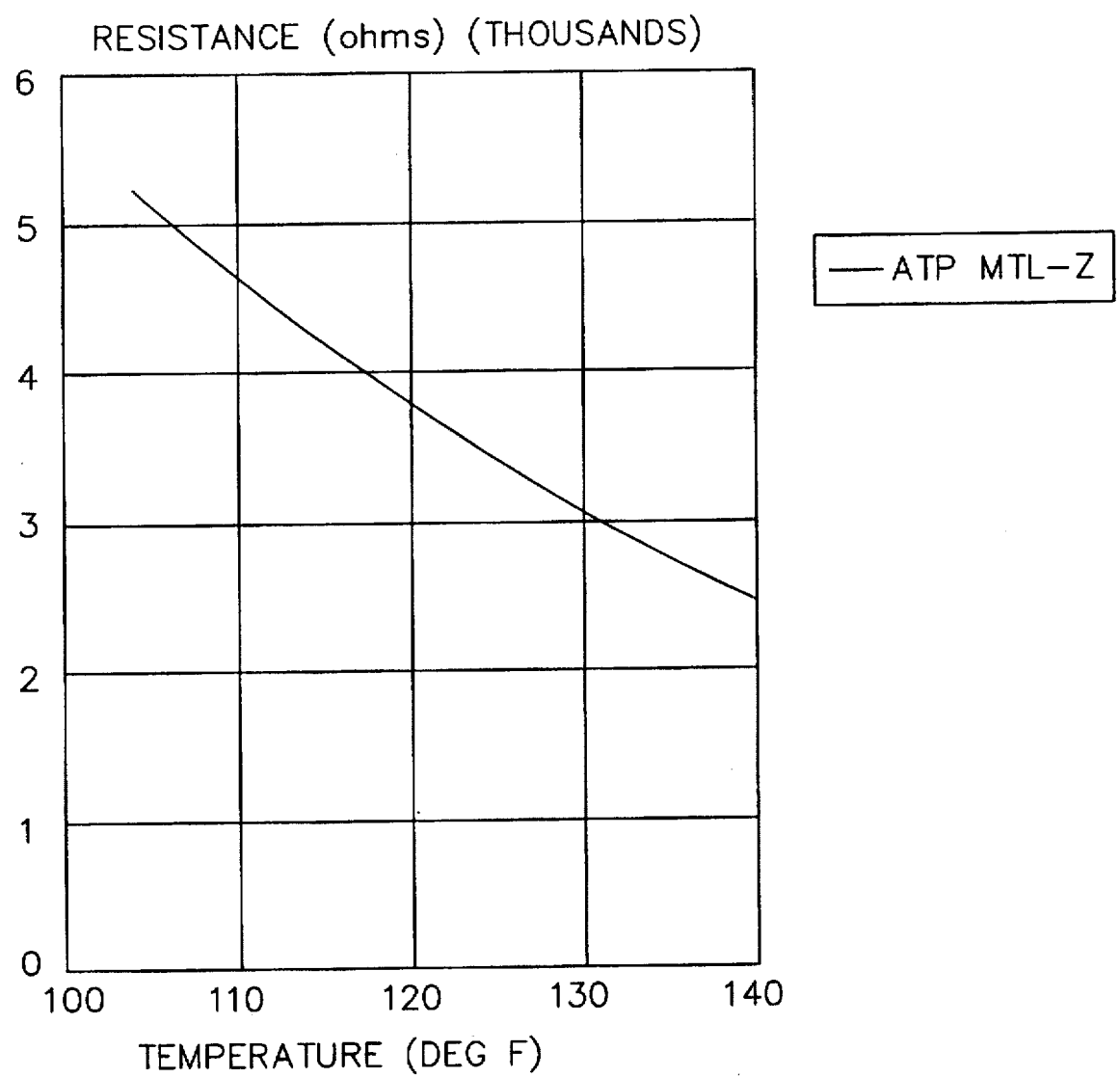
FIG. 11 is a thermistor chart for an exemplary thermistor (an ATP Type Z thermistor) suitable for use in measuring the temperature of hot gas and measuring the temperature of water in the manner and for the purposes contemplated herein.

Reference should now be made to FIG. 11 which, as indicated hereinbefore, depicts a thermistor chart for an exemplary thermistor suitable for use in measuring the temperature of hot gas and measuring the temperature of water in the manner and for the purposes described hereinbefore.

In particular, FIG. 11 depicts a thermistor chart for ATP type Z thermistors.

What has been described in detail hereinabove which meet all of the aforestated objectives. As previously indicated, those skilled in the art will recognize that the foregoing description has been presented for the sake of illustration and description only. It is not intended to be exhaustive or to limit the invention to the precise form disclosed, and obviously many modifications and variations are possible in light of the above teaching.

For example, an alternate embodiment of the invention could include a timer control mechanism which favors off peak consumption of electrical energy to boost the temperature of; a further alternate embodiment of the invention could employ a set of n electrical heating elements (with n being greater than 2), with any combination of the electrical heating elements having their set points capable of being adjusted (or an element being locked out entirely) by the heater control mechanism, etc.

20

The embodiments and examples set forth herein were presented in order to best explain the principles of the instant invention and its practical application to thereby enable others skilled in the art to best utilize the instant invention in various embodiments and with various modifications as are suited to the particular use contemplated.

In view of the above it is, therefore, to be understood that the claims appended hereto are intended to cover all such modifications and variations which fall within the true scope and spirit of the invention.

What is claimed is:

1. A heat recovery system integrated in a hot water heating system combinable with an air conditioning loop containing hot gas wherein said hot water system selectively utilizes heat recovered from said hot gas to produce and store hot water at a preselected temperature level in a single storage tank contained therein, comprising:

(a) means for determining the presence and temperature of hot gas in said air conditioning loop;

(b) means for determining the temperature of water stored in said water sotrage tank;

(c) a heat exchanger located within said tank that is energized by said gas;

(d) a plurality of heating elements, each located in separate planes within said tank; and (e) control means for selectively activating said heat exchanger and at least one of said plurality of heating elements as a function of said preselected temperature level, the determined presence an temperature of hot gas in said air conditioning loop and the determined temperature of water stored in said water storage tank, wherein said control means further comprises:

(e1) processing means used to control the selective activation of said heat exchanger and at least one of said plurality of heating elements as a function of said preselected temperature level, the determined presence and temperature of hot gas in said air conditioning loop and the determined temperature of water stored in said water storage tank; and (e2) activation means, coupled to said processing means and a power supply, for selectively enabling the flow of hot gas to said heat exchanger and selectively energizing of at least one of said plurality of heating elements under the control of said processing means, wherein said activation means further comprises:

(e2a) bypass means for enabling hot gas in said air conditioning loop to bypass said hot water heating system so long as the determined temperature of water stored in said tank remains above a first predetermined threshold value;

(e2b) gas diverter means for enabling hot gas in said air conditioning loop to enter said heat exchanger whenever the determined temperature of the water stored in said tank falls below a second predetermined threshold value and hot gas is present in said air conditioning loop; and (e2c) switching means for selectively switching on at least one heating element included in said plurality of heating elements whenever the determined temperature of water stored in said tank falls below a third predetermined threshold value independent of the presence of hot gas in said air conditioning loop and for selectively switching on at least one other heating element included in said plurality of heating elements whenever the determined temperature of water stored in said tank falls below a fourth predetermined threshold value and hot gas is not present in said air conditioning loop.

2. Apparatus as set forth in claim 1 wherein at least one of said plurality of heating elements may each be electrically energized.

3. Apparatus as set forth in claim 1 wherein said means for determining the temperature of water is operative to measure water temperature at a plurality of locations within said tank.

4. Apparatus as set forth in claim 3 wherein at least one of said plurality of locations is in proximity to the top of said tank.

5. Apparatus as set forth in claim 4 wherein at least one other of said plurality of locations is below the location that is in proximity to the top of said tank.

6. Apparatus as set forth in claim 1 wherein said means for determining the temperature of water comprises at least one thermistor.

7. Apparatus as set forth in claim 6 wherein said means for determining the temperature of water is a temperature probe that includes a plurality of thermistors, each of which is associated with one of said plurality of heating elements and is located in the plane of its associated heating element.

8. Apparatus as set forth in claim 1 wherein said means for determining the presence and temperature of hot gas in said air conditioning loop comprises a thermistor.

9. Apparatus as set forth in claim 1 wherein said heat exchanger is a hot gas coil.

10. Apparatus as set forth in claim 1 wherein one of said plurality of heating elements is located in proximity to the top of said tank and another of said plurality of heating elements is located in proximity to the bottom of said tank.

11. Apparatus as set forth in claim 1 wherein said bypass means further comprises a pair of solenoid activated gas flow control valves operated by a relay coupled to and controlled by said processing means.

12. Apparatus as set forth in claim 1 wherein said gas diverter means further comprises a pair of solenoid activated gas flow control valves operated by a relay coupled to and controlled by said processing means.

13. Apparatus as set forth in claim 1 wherein said switching means is a relay coupled to and controlled by said processing means.

14. Apparatus as set forth in claim 1 wherein said processing means is programmable.

15. Apparatus as set forth in claim 16 wherein said programmable processing means is a microprocessor.

16. Apparatus as set forth in claim 1 further comprising a means for adjusting said preselected temperature level.

17. Apparatus as set forth in claim 16 wherein said means for adjusting is a user accessible potentiometer.

18. Apparatus as set forth in claim 1 wherein said control means further comprises clock means for determining the period of time hot gas is absent from said loop to thereby indicate the length of time said air conditioning system is off.

19. Apparatus as set forth in claim 18 wherein said control means is further operative to adjust the set point of at least one of said plurality of heating elements depending on the length of time said air conditioning system is off.

20. Apparatus as set forth in claim 10 wherein the heating element located in proximity to the bottom of said tank is disabled whenever hot gas from said air conditioning loop is actually being used to heat water stored in the bottom of said tank.

21. Apparatus as set forth in claim 20 wherein the set point of said heating element located in proximity to the bottom of said tank is set back below said preselected temperature level if hot gas is not being used but is available from said air conditioning loop to heat water stored in the bottom of said tank.

22. A heat recovery system, for use in water heating system having a preselected water temperature set point, to selectively recover heat from hot gas present in an air conditioning loop to which said water heating system may be coupled, comprising:

(a) a water storage tank;

(b) a heat exchanger located in said tank;

(c) a plurality of heating elements located in said tank;

(d) first means for determining the temperature of water stored at a first location in proximity to the top of said tank and for outputting a first signal indicative thereof;

(e) second means for determining the temperature of water stored at a second location in said tank below said first location and for outputting a second signal indicative thereof;

(f) third means for determining the presence and temperature of said hot gas in said loop and for outputting a third signal indicative thereof; and (g) control means, responsive to said first, second and third signals for selectively activating said heat exchanger and one or more of said plurality of other heating elements as a function of said preselected water temperature set point, wherein said control means further comprises:

(g1) processing means used to control the selective activation of said heat exchanger and at least one of said plurality of heating elements as a function of said preselected water temperature set point, the determined presence and temperature of hot gas in said air conditioning loop and the determined temperature of water stored in said water storage tank at said first and second locations; and (g2) activation means, coupled to said processing means and a power supply, for selectively enabling the flow of hot gas to said heat exchanger and the energizing of at least one of said plurality of heating elements under the control of said processing means, wherein said activation means further comprises:

(g2a) bypass means for enabling hot gas in said air conditioning loop to bypass said hot water heating system so long as the determined temperature of water stored in said tank remains above a first predetermined threshold value;

(g2b) gas diverter means for enabling hot gas in said air conditioning loop to enter said heat exchanger whenever the determined temperature of the water stored in said tank falls below a second predetermined threshold value and hot gas is present in said air conditioning loop; and (g2c) switching means for selectively switching on at least one heating element included in said plurality of heating elements whenever the determined temperature water stored in said tank falls below a third predetermined threshold value independent of the presence of hot gas in said air conditioning loop and for selectively switching on at least one other heating element included in said plurality of heating elements whenever the determined temperature of water stored in said tank falls below a fourth predetermined threshold value and hot gas is not present in said air conditioning, loop.

23. Apparatus as set forth in claim 22 wherein at least one of said plurality of heating elements may each be electrically energized.

24. Apparatus as set forth in claim 22 wherein said control means is programmable.

25. Apparatus as set forth in claim 22 wherein said first, second and third means for determining each further comprise a thermistor.

26. Apparatus as set forth in claim 22 further comprising means for adjusting said preselected water temperature set point.

27. Apparatus as set forth in claim 22 wherein said bypass means further comprises a pair of solenoid activated gas flow control valves operated by a relay coupled to and controlled by said processing means.

28. Apparatus as set forth in claim 22 wherein said gas diverter means further comprises a pair of solenoid activated gas flow control valves operated by a relay coupled to and controlled by said processing means.

29. Apparatus as set forth in claim 22 wherein said switching means is a relay coupled to and controlled by said processing means.

30. A heat recovery system including an air conditioning loop containing hot gas and a hot water heating system, having a storage tank included therein, which may be selectively incorporated as part of said air conditioning loop, comprising:
  (a) control means for determining if hot gas is present in said air conditioning loop, said control means further comprising:
    (a1) first temperature sensing means for determining the presence or absence of said hot gas in said air conditioning loop; and
    (a2) second temperature sensing means for determining the temperature of water stored in said hot water tank;
  (b) first means for enabling hot gas in said air conditioning loop to bypass said hot water heating system;
  (c) second means for enabling hot gas in said air conditioning loop to enter a heating coil contained in said hot water heating system; and
  (d) alternate means for heating water stored in said tank, wherein said control is operative to:
    (1) activate said first means in response to a determination by said second temperature sensing means that the temperature of the water stored in said tank is above a first predetermined threshold value;
  and is further operative to:
    (2) activate said second means in response to a determination by said second temperature sensing means that the temperature of the water stored in said tank is below a second predetermined threshold value and a determination by said first temperature sensing means that hot gas is present in said air conditioning loop.

31. Apparatus as set forth in claim 30 wherein said alternate means for heating comprises at least one means for electrically heating the water contained in said tank.

32. Apparatus as set forth in claim 31 wherein said at least one means for electrically heating further comprises at least one electric heating element located in proximity to the bottom of said tank and at least one electric heating element located in proximity to the top of said tank.

33. Apparatus as set forth in claim 30 wherein said control means is operative to turn on said alternate means for heating in response to a determination by said second temperature sensing means that the temperature of the water stored in said tank is below a third predetermined threshold value and a determination by said first temperature sensing means that hot gas is not present in said air conditioning loop.

34. Apparatus as set forth in claim 30 wherein said control means is operative to adjust the set point of said second temperature sensing means as a function of the output of said first temperature sensing means.

35. Apparatus as set forth in claim 34 wherein said control means is further operative to adjust the set point of said second temperature sensing means as a function of the amount of time passing after said first temperature sensing means determines the absence of hot gas in said air conditioning loop.

36. Apparatus as set forth in claim 30 wherein said second temperature means further comprises a plurality of thermistors placed in different locations within said tank.

37. Apparatus for controlling a heat recovery process performed in a hot water heating system combinable with an air conditioning loop containing hot gas wherein said hot water system selectively utilizes heat recovered from said hot gas to produce and store hot water at a preselected temperature level in a single storage tank contained therein and further wherein said tank includes a plurality of heaters including a heat exchanger that may be energized by the hot gas when the gas is available and at a desired temperature and at least one other heating element, comprising:
  (a) means for determining the presence and temperature of hot gas in said air conditioning loop;
  (b) means for determining the temperature of water stored in said water storage tank; and
  (c) processing means, coupled to said means for determining the presence and temperature of hot gas and said means for determining the temperature of water stored in said water storage tank, for activating at least one of said plurality of heaters located in said tank as a function of said preselected temperature level, the temperature of hot gas when present and the temperature of water stored in said water storage tank, wherein said processing means is further operative to:
    (c1) channel hot gas in said air conditioning loop to bypass said hot water heating system so long as the temperature of the water stored in said tank remains above a first predetermined threshold value;
    (c2) channel hot gas in said air conditioining loop to enter said heat exchanger whenever the temperature of the water stored in said tank falls below a second predetermined threshold value and hot gas is present in said air conditioning loop; and
    (c3) switch on at least one of said plurality of heaters whenever the temperature of water stored in said tank falls below a third predetermined threshold value.

38. Apparatus as set forth in claim 32 wherein said means for determining the temperature of water stored in said water storage tank is operative to measure water temperature at a plurality of locations within said tank.

39. Apparatus as set forth in claim 38 wherein at least one of said plurality of locations is in proximity to the top of said tank.

40. Apparatus as set forth in claim 39 wherein at least one other of said plurality of locations is below the location that is in proximity to the top of said tank.

41. Apparatus as set forth in claim 38 wherein one of said plurality of heaters is located in proximity to the top of said tank and another of said plurality of heaters is located in proximity to the bottom of said tank.

42. A method for controlling a heat recovery process performed in a hot water heating system combinable with an air conditioning loop containing hot gas wherein said hot water system selectively utilizes heat recovered from said hot gas to produce and store hot water at a preselected temperature level in a single storage tank contained therein and further wherein said tank includes a plurality of heaters including a heat exchanger that may be energized by the hot gas when the gas is available and at a desired temperature and at least one other heating element, comprising the steps of:

- (a) determining the presence and temperature of hot gas in said air conditioning loop;
- (b) determining the temperature of water stored in said water storage tank;
- (c) selectively activating at least one of said plurality of heaters located in said tank as a function of said preselected temperature level, the temperature of hot gas when present as determined in step (a) and the temperature of water stored in said water storage tank as determined in step (b), said step of selectively activating further comprising the steps of:
  - (c1) channeling hot gas in said air conditioning loop to bypass said hot water heating system so long as the temperature of the water stored in said tank remains above a first predetermined threshold value;
  - (c2) channelling hot gas in said air conditioning loop to enter said heat exchanger whenever the temperature of the water stored in said tank falls below a second predetermined threshold value and hot gas is present in said air conditioning loop; and
  - (c3) switching on at least one of said plurality of heaters whenever the temperature of water stored in said tank falls below a third predetermined threshold value.

43. A method as set forth in claim 42 wherein said step of determining the temperature of water stored in said water storage tank is performed by measuring water temperature at a plurality of locations within said tank.

44. A method as set forth in claim 43 wherein at least one of said plurality of locations is in proximity to the top of said tank.

45. A method as set forth in claim 44 wherein at least one other of said plurality of locations is below the location that is in proximity to the top of said tank.

46. A method as set forth in claim 42 wherein one of said plurality of heaters is located in proximity to the top of said tank and another of said plurality of heaters is located in proximity to the bottom of said tank.

47. A method as set forth in claim 42 wherein said preselected temperature level is adjustable.

48. A method as set forth in claim 42 wherein each of said predetermined threshold values is adjustable.

49. A method as set forth in claim 42 further comprising the step of determining the period of time hot gas is absent from said loop to thereby indicate the length of time said air conditioning system is off.

50. A method as set forth in claim 49 further comprising the step of adjusting the set point of at least one of said at least one other heating element depending on the length of time said air conditioning system is off.

51. A method as set forth in claim 46 wherein a heating element located in proximity to the bottom of said tank, other than said heat exchanger, is disabled whenever hot gas from said air conditioning loop is actually being used to heat water stored in the bottom of said tank.

52. A method as set forth in claim 51 wherein the set point of the said heating element located in proximity to the bottom of said tank is set back below said preselected temperature level if hot gas is not being used but is available from said air conditioning loop to heat water stored in the bottom of said tank.

* * * * *